United States Patent [19]
Yamanaka et al.

[11] Patent Number: 5,598,297
[45] Date of Patent: Jan. 28, 1997

[54] IMAGE DISPLAY UNIT

[75] Inventors: Atsushi Yamanaka, Chiba; Kunio Kojima, Tougane, both of Japan

[73] Assignee: Sharp Kabushiki Kaisha, Osaka, Japan

[21] Appl. No.: 291,865

[22] Filed: Aug. 17, 1994

[30] Foreign Application Priority Data

Aug. 26, 1993 [JP] Japan .................................. 5-211493
Jan. 27, 1994 [JP] Japan .................................. 6-007455

[51] Int. Cl.⁶ .............................. G02B 27/22; G09G 5/00
[52] U.S. Cl. ........................... 359/462; 359/477; 345/114
[58] Field of Search .................................. 359/462, 466, 359/470, 472, 477, 630, 632, 633, 634, 59; 348/794; 345/113, 114, 7, 8, 9

[56] References Cited

U.S. PATENT DOCUMENTS

| | | | |
|---|---|---|---|
| 2,713,015 | 7/1955 | Paulsohn | 359/477 |
| 2,798,407 | 7/1957 | Kneitel | 359/462 |
| 4,167,019 | 9/1979 | Shepperd | 345/114 |
| 4,636,866 | 1/1987 | Hattori | 348/794 |
| 4,757,378 | 7/1988 | Hackett . | |
| 5,130,794 | 7/1992 | Ritchey . | |

FOREIGN PATENT DOCUMENTS

| | | |
|---|---|---|
| 0575257 | 12/1993 | European Pat. Off. . |
| 4009947 | 10/1991 | Germany . |
| 60-26325 | 2/1985 | Japan . |
| 4033679 | 2/1992 | Japan . |
| 4-106668 | 4/1992 | Japan . |

*Primary Examiner*—Paul M. Dzierzynski
*Assistant Examiner*—Audrey Chang

[57] ABSTRACT

An image display unit is capable of displaying an environmental image at the periphery of an image on a display screen in order to create an image having heightened reality and to provide greater comfort to the eyes. The image display unit includes a liquid-crystal display for displaying a main image at a central portion of a visual field, a back light thereof, a slide for displaying an image at the periphery of a main central image, a back light thereof and a lens system for magnifying an image synthesized from the above-mentioned images. Displaying an environmental image at the periphery of an image on a display screen in accordance with an observer's preference, effectively raises the ambiance of the display and increases the comfort of viewing the display.

29 Claims, 26 Drawing Sheets

IMAGE DISPLAY UNIT

BACKGROUND OF THE INVENTION

The present invention relates to an image display unit and, more particularly, to an image display unit which is a head-mounted display (HMD) type for seeing a liquid crystal display through a magnifying lens and which includes an environmental image display device for displaying an environmental image at the peripheral portion of an observer's field of vision in order to improve the ambiance and which includes an environmental image synthesizing device for synthesizing an environmental image around an input image to increase the ambiance of the input image. The proposed image display unit is intended for use, e.g., in observing TV programs, video programs and stereoscopic images as well as for displaying an image with virtual reality, for monitoring TV games and for monitoring information fed into word processors and computers.

Recently, a head-mounted display (HMD) made on the basis of a miniaturized liquid-crystal display has been developed.

All components are mounted in a spectacle-like casing which is mounted on the head of the observer. Each of the two spectacle-like portions of the casing contain a back light, a liquid-crystal display, a diaphragm and a lens arranged in this order from the outside thereof. Therefore, when the observer puts the casing on his head, he can see an enlarged image of the liquid-crystal display.

In the above-mentioned conventional head-mounted display, only an effective area of liquid-crystal display provided with a back light is made visible and covered at its periphery by the black diaphragm. Accordingly, the observer can look at a screen appearing in the dark.

The conventional display or projector is intended to increase the reality of an image by increasing the size of its display screen and the conventional head-mounted display is intended to increase the ambiance of an image by enlarging it through a magnifying device.

The Japanese laid-open patent application No. 4-106668 describes such a conventional display unit that operates as follows:

When coordinates of a center image, as positional information, are entered by an input device, the center image generating device reads out an image corresponding to the center portion area specified by the positional information from the image stored and a peripheral image generating device takes out a peripheral image from the image storage according to the positional information. An image generating device synthesizes a final image from the center portion image prepared by the center image generating device and a peripheral image prepared by the peripheral image generating device and indicates it on an image displaying device. A thus constructed display unit provides the possibility of displaying a detailed image and a general image at the same time on a screen to clearly indicate the correlation of the two images from which one can know the position and/or connection of two referred parts on the two images.

In any conventional image display unit, wherein a display screen appears in the dark as described above, there may arise three problems that need to be solved. The first problem includes a large difference of luminosity between the center portion and the peripheral portion of the field of vision which tends to make a user's eyes tired. The second problem includes seeing the screen in the dark which may cause someone to perceive it as smaller and less powerful than it is because of not being compared with the displayed object, just as if one looked at the moon on a dark night. The third problem includes seeing an image on a screen in the dark. The observer may be puzzled with no way to judge where he is and he cannot enjoy the ambiance like seeing a movie in a movie theater or a TV program in his house.

The prior art has attempted to increase the reality of an image by physically enlarging the display screen or by physically enlarging the image itself in the case of a head-mounted display. Obtaining an image in that way does not provide the ambiance as expected by an observer despite its enlarged size. In this connection, it is necessary to consider two factors which perceptual psychology points out as follows:

The first factor is that the observer judges the screen's size by comparing it with a known (familiar to him) object that exists near the screen. The second factor is that the observer also judges the position of the screen with regard to the perspective representation and then recognizes the size of any object in the image.

By increasing only the image's size of the display without providing any clue to refer it to, make it impossible to allow the observer to feel his presence therein.

The above-mentioned Japanese laid-open patent application No. 4-106668 describes such a conventional display method that is intended to clearly display a drawing by indicating a drawing in detail at the center portion of the display screen and the same but a simplified drawing at the peripheral portion thereof. On the contrary, the present invention provides an image display system intended to increase the ambiance and the impression of a main image at a center portion of a display screen by displaying a different environmental image (e.g., an image of seats in movie theaters) around the center image. Therefore, the image display unit according to the present invention is similar to the prior art display unit only by separately processing a center portion image and peripheral portion image but it differs considerably from the prior art in its purpose and processing methods.

SUMMARY OF THE INVENTION

It is an object of the present invention to provide an image display unit which is provided with a slide and a back light for generating an environmental image at the peripheral portion of a liquid-crystal display to increase the impressive power of a main image, providing also the possibility of enjoying visual and sound environments; and which is capable of using a photograph or printed matter that represents an environmental image at the peripheral portion of a liquid-crystal display to increase the impression of power and the ambiance of an image on the display; and which is capable of synthesizing an environmental image at the peripheral portion of an input image and of displaying the synthesized image on the display to make an observer perceive the input image as being larger than its real size and to raise thereby the ambiance and reality of the image displayed.

It is another object of the present invention to reduce the difference in luminosity between the central portion image and the peripheral portion image in order to not to make one's eyes tired by displaying an environmental image around the center display in an image display unit wherein an image on the display is enlarged and seen through a magnifying lens.

It is another object of the present invention to make it possible that a clue for the observer to judge the size of the central display is given by the peripheral portion of the visual field, e.g., seats and boundary lines between a floor, a wall and a ceiling can serve as clues which are referred to as <a pitch of texture density> or <a known object's size> in psychology, and the observer may perceive the center display corresponding in size to a screen of a movie theater, feeling an increased power of the image displayed thereon.

It is another object of the present invention is to make it possible for the observer to enjoy the ambiance produced by the environmental image which is further replaced by his favorite one by selectively replacing the photograph producing the environmental image.

It is another object of the present invention to make it possible for an environmental image, synthesized around the input image, to give a clue to the observer to perceive the display as being considerably larger than the real, one with increased ambiance and attractive power to make the observer feel as if he actually is in the environmental image, and, furthermore, to provide for the possibility of selectively changing the environmental image to another one of the observer's preference.

As described above, the conventional liquid-crystal display is provided with a black-colored diaphragm for covering its peripheral portion to expose only the effective field of vision therein. On the contrary, an image display unit according to the present invention, is featured by the following functions:

(1) An image display unit is provided with, instead of a conventional diaphragm, a back light and a slide for the peripheral field of vision of the display in order to display a liquid-crystal display image in a center frame and a picture of the slide at the peripheral portion outside of the central frame. As the liquid-crystal display and the slide are arranged on the same plane substantially, the liquid-crystal display image and the slide picture image are seen as if they are at the same distance from the observer who sees them through a magnifying lens. Accordingly, the observer may observe a whole image as if he saw it in a movie theater. The advantages of the image display are as follows:

First, the difference in luminosity between the central portion image and the peripheral portion image (not black as it is in the conventional display) is considerably reduced so as not to make one's eyes tired. Second, a clue for the observer to judge the size of the central liquid-crystal display is given by the peripheral portion image. Third, the observer can enjoy the ambiance of the image, which is produced by the peripheral picture image and is further replaceable with his favorite one by changing the slide bearing the environmental image.

(2) The observer can see a display image in a central frame and an environmental (photographic) image outside of the central image frame. As the liquid-crystal display and the photograph are arranged on the same plane substantially, the observer can see two images enlarged through a magnifying lens as if the images were at the same distance from him. Accordingly, the observer may observe the whole image as if he saw the center display image, for example, in a movie theater. The first advantage of this display is that a difference of luminosity between the center portion image and the peripheral portion image (in comparison with the black periphery of the conventional displays) is considerably reduced in order not to make one's eyes tired. The second advantage is that a clue for the observer to judge the size of the central display is given at the peripheral portion of the visual field. For example, seats and boundary lines between a floor, a wall and a ceiling can serve as clues which are referred to as <a pitch of texture density> or <a known object's size> in psychology. Consequently, the observer may perceive the central display corresponding in size to the screen of a movie theater, feeling an increase of power of the image displayed thereon. The third advantage is that the observer may enjoy the ambiance produced by the environmental image which also can be replaced by his favorite one by selectively replacing the photograph producing the environmental image.

(3) The display is capable of displaying an input image with an environmental image synthesized thereto. In this case the input image is displayed in a reduced size at the center portion of an output image but the environmental image gives a clue for the observer to perceive the display screen as being as large as the screen of a movie theater and to enjoy the display with the ambience of a movie theater. By changing the ratio of the input image and the environmental image in size on the display it is possible to freely adjust the ambiance of the output image. This function is effective to use in such a way that the ambiance of an output image is preset at the observer's request or an environmental image is set initially at a considerable ratio to produce an increased environmental reality and then an input image is gradually increased in size to make the observer feel like being there and immersed in the image displayed. Furthermore, it is possible to change an environmental image to the observer's favorite one.

The present invention is effective to use in a head-mounted display to attain the increased virtual reality of an image if the display is being used for such a purpose.

The purpose of this invention is to provide an image display unit which is capable of displaying an environmental image at the periphery of an image on a display screen in order to create an image having enough reality and for being comfortable to the eyes. The image display unit comprises a liquid-crystal display for displaying a main image at a central portion of a visual field, a back light thereof, a slide for displaying an image at the periphery of a main central image, a back light thereof and a lens system for magnifying an image synthesized from the above-mentioned images. Displaying an environmental image at the periphery of an image on a display screen suited to the observer's preference, effective to raise the ambiance of the display and that does not make the observer's eyes tired.

PREFERRED EMBODIMENT OF THE INVENTION

Recently, a head-mounted display (HMD) made on the basis of a miniaturized liquid-crystal display has been developed.

Figure 1:
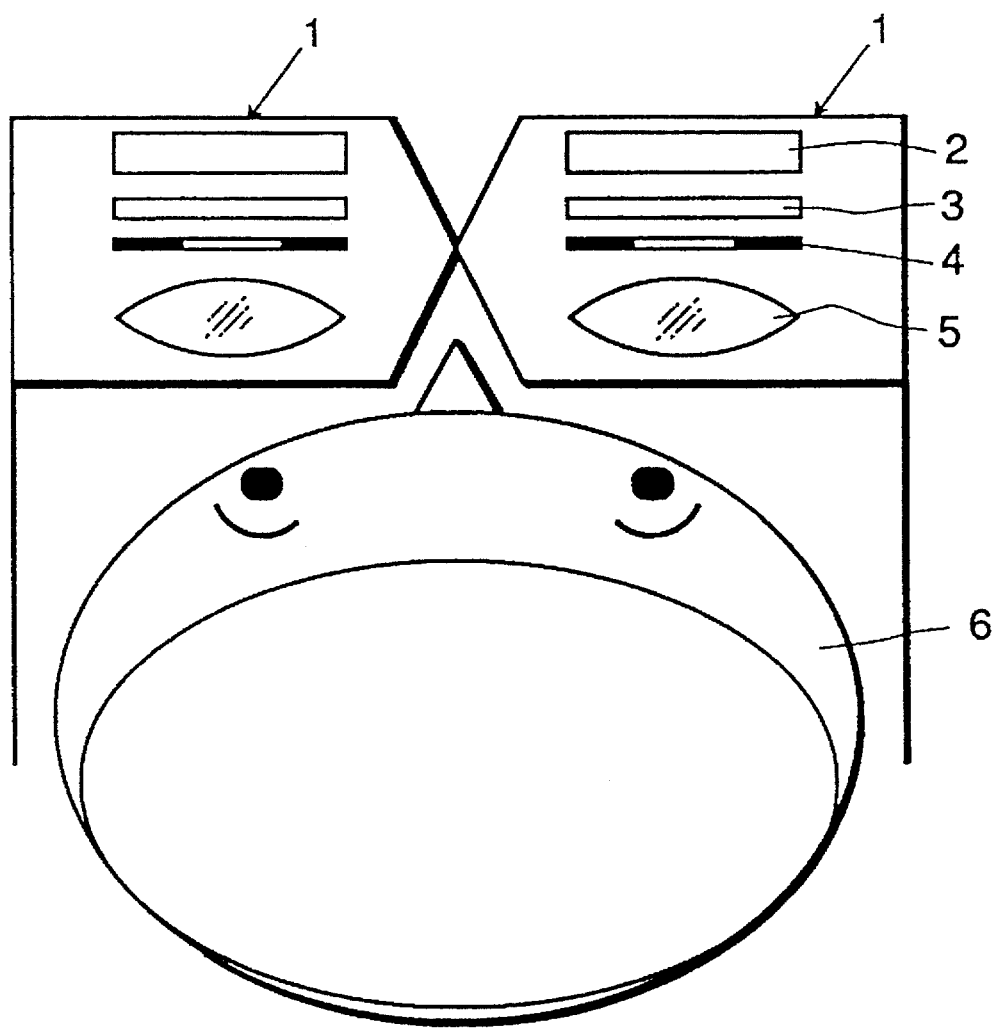
FIG. 1 is an explanatory view of a conventional head-mounted display.

FIG. 1 is a construction view for explaining a head-mounted display which is composed of a spectacle-like casing 1, a pair of back lights 2, a pair of liquid-crystal displays 3, a pair of diaphragms 4 and a pair of lenses 5. In FIG. 1, numeral 6 designates an observer.

All components are mounted in a spectacle-like casing 1 which is mounted on the head of the observer 6. Each of the two spectacle-like portions of the casing contain a back light 2, a liquid-crystal display 3, a diaphragm 4 and a lens 5 arranged in this order from the outside thereof. Therefore, when the observer 6 puts it on his head, he can see an enlarged image of the liquid-crystal display 3.

Figure 2:
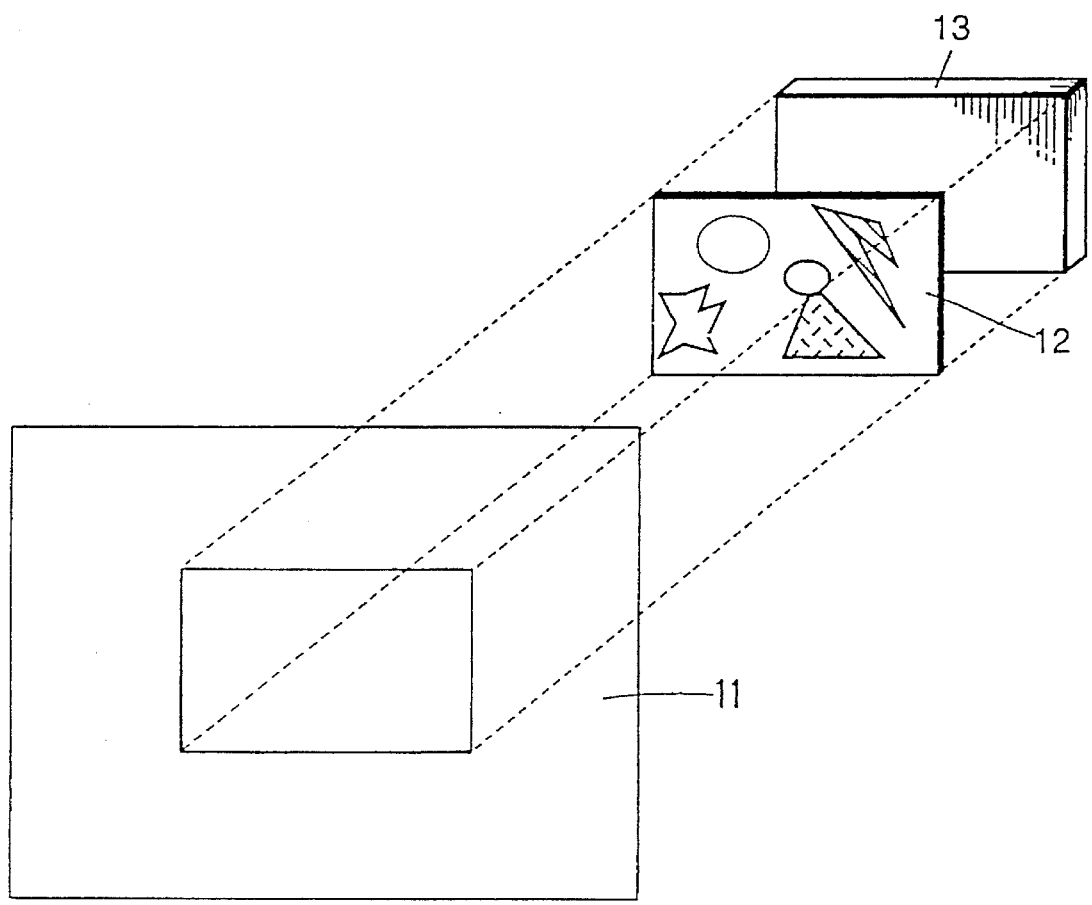
FIG. 2 is an explanatory view of a peripheral diaphragm for a conventional display.
Figure 3:
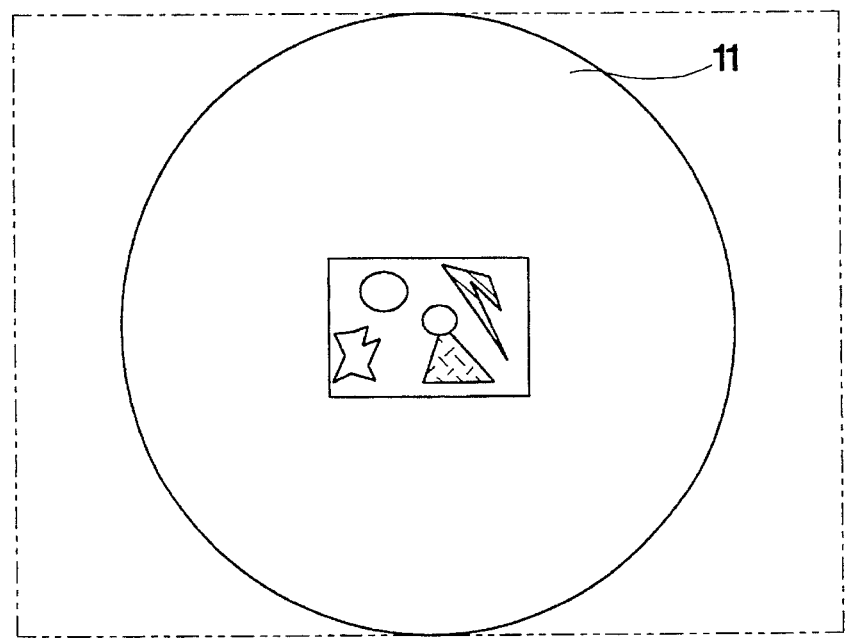
FIG. 3 shows a field of vision of an observer when he sees a peripheral diaphragm of a conventional display.

In the above-mentioned conventional head-mounted display, as shown in FIG. 2, only an effective area of liquid-crystal display 12 provided with a back light 13 is made visible and covered at its periphery by the black diaphragm 11. Accordingly, the observer can look at a screen appearing in the dark as shown in FIG. 3.

The conventional display or projector is intended to increase the reality of an image by increasing the size of its display screen and the conventional head-mounted display is intended to increase the ambiance of an image by enlarging it through a magnifying device.

Figure 4:
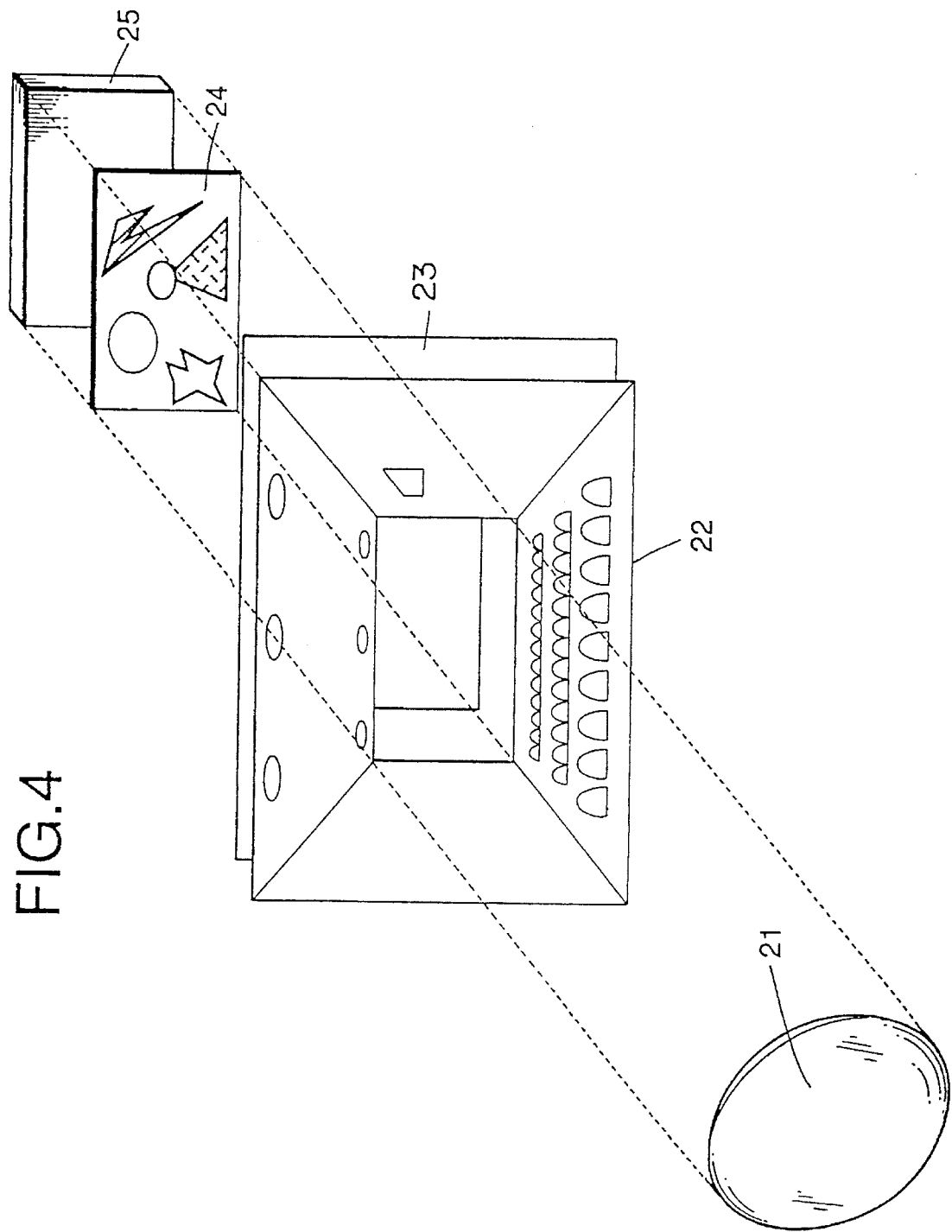
FIG. 4 is a construction view for explaining an example of an image display unit embodied in the present invention.

Referring now to the accompanying drawings, a preferred embodiment of the present invention will be described in detail as follows:

FIG. 4 is a construction view for explaining an image display unit embodied in the present invention. In FIG. 4, 21 is a magnifying lens system, 22 is a slide, 23 is a back light for aiding in the peripheral visual field, 24 is a liquid-crystal display and 25 is a back light for helping with the central visual field.

FIG. 4 shows an environmental image display device which, instead of a conventional diaphragm 1 shown in FIG. 2, has a back light 23 for the peripheral portion of the visual field and a slide 22 arranged as shown in FIG. 4. The back light 23 and the slide 22 each have one center hole corresponding in size to the effective area of the liquid-crystal display 24. Although in FIG. 4, the back light 25 for a central visual field, the liquid-crystal display 24, the back light 23 for the peripheral visual field and the slide 22 are shown as separated from each other for the purpose of illustration, they are practically placed one upon the other to form one piece. It is also possible to replace the slide 22 with another at the observer's request. It is further possible to place a combination of the slide 22 and the liquid-crystal display 24 on the front of the back light 23 for aiding the peripheral visual field.

Figure 5:
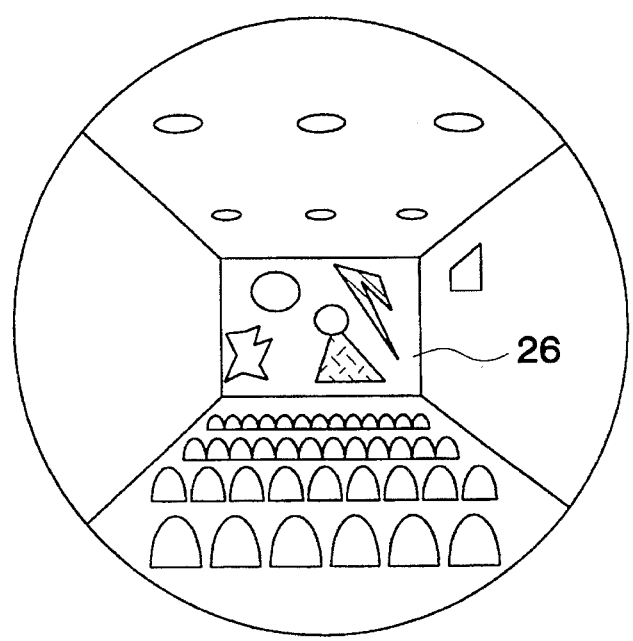
FIG. 5 shows the field of vision of an observer when he sees an image produced by an environmental image display device according to the present invention.

Referring to FIG. 5, there is shown the visual field of an image display with an environmental image display device of FIG. 4 when an observer looks at the display screen. In the image display with the environmental image display device, the observer can see, for example, an image as shown in FIG. 5. An image of the liquid-crystal display 24 is seen in the central frame 26 and a picture image of the slide 22 is seen at the periphery thereof. As the liquid-crystal display 24 and the slide 22 of FIG. 4 are arranged on the same plane substantially, two images can be seen at substantially the same distance when the observer sees them through the magnifying lens 21. Consequently, the observer may perceive the image of FIG. 5 as if he saw it on a screen in a movie theater.

The thus obtained image display offers the following advantages in comparison with the prior art wherein an image was seen surrounded by the dark.

First, the image is surrounded by an environmental image (not a black one) with a reduced difference in luminosity between i.e., not to make an observer's eyes tired. Second, a clue for the observer to judge the size of the central liquid-crystal display is given in the environmental image. At this instance, as shown in FIG. 5 seats and boundary lines between a floor, a wall and a ceiling can serve as clues which are referred to as <a pitch of texture density> or <a known object's size> in psychology. Consequently, the observer may perceive the central display corresponding in size to the screen of a movie theater, thereby receiving an increase in the power of the image displayed thereon. Third, the observer may enjoy the ambiance produced by the environmental image which can also be changed by replacing the slide to his favorite one.

Figure 6:
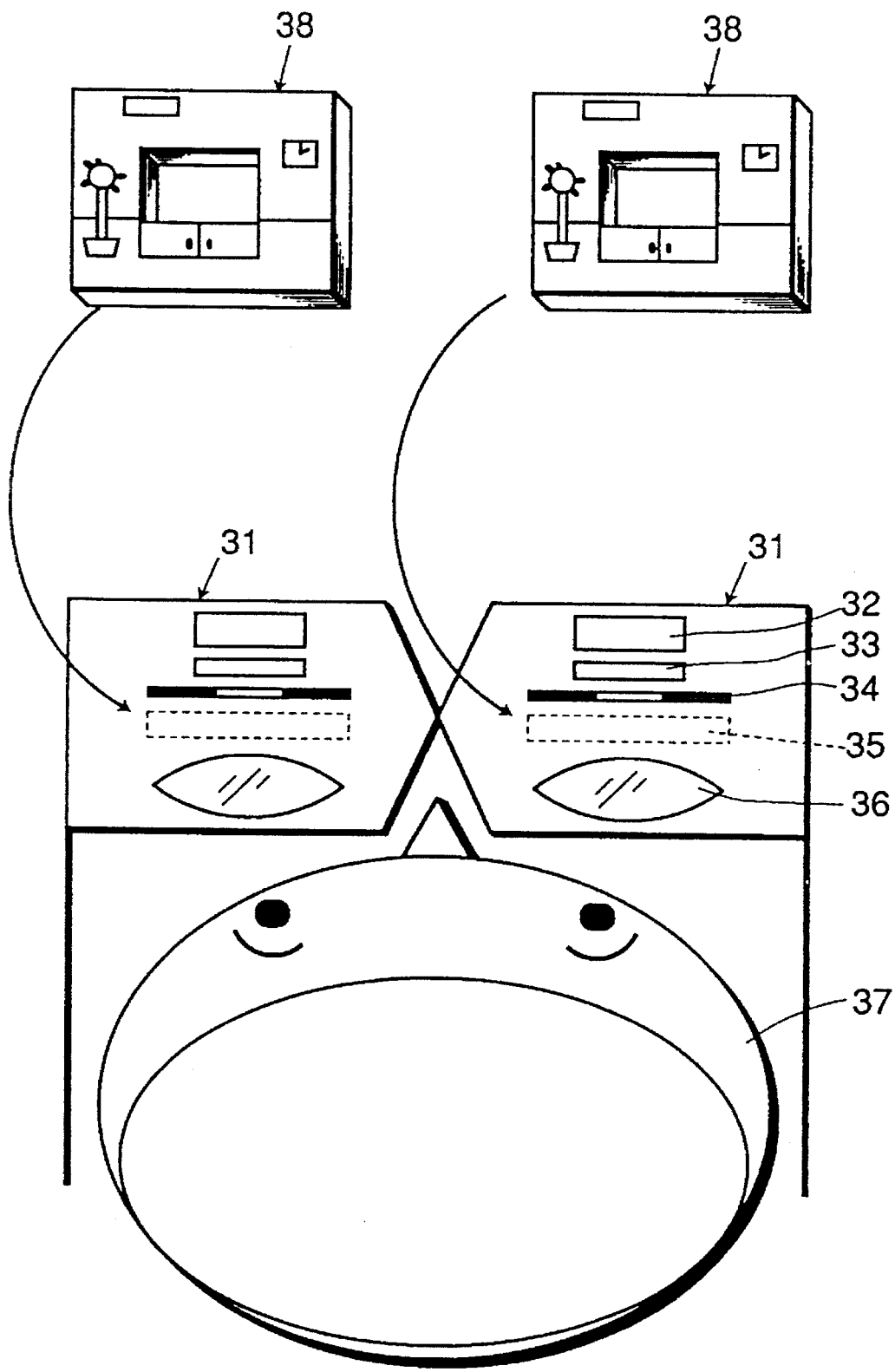
FIG. 6 is a view for explaining a head-mounted type display unit with an environmental image display device, according to the present invention.

Referring to FIG. 6, there is shown an example of an image display unit, embodied in the present invention, which is applied to a head-mounted display (HMD). In FIG. 6, 81 is a spectacle-like casing, 32 is a back light for the central visual field, 38 is a liquid-crystal display, 34 is a back light for the peripheral visual field, 35 is a space for replacing a slide, 36 is a magnifying lens, 37 is an observer and 38 is a slide.

Figure 7:
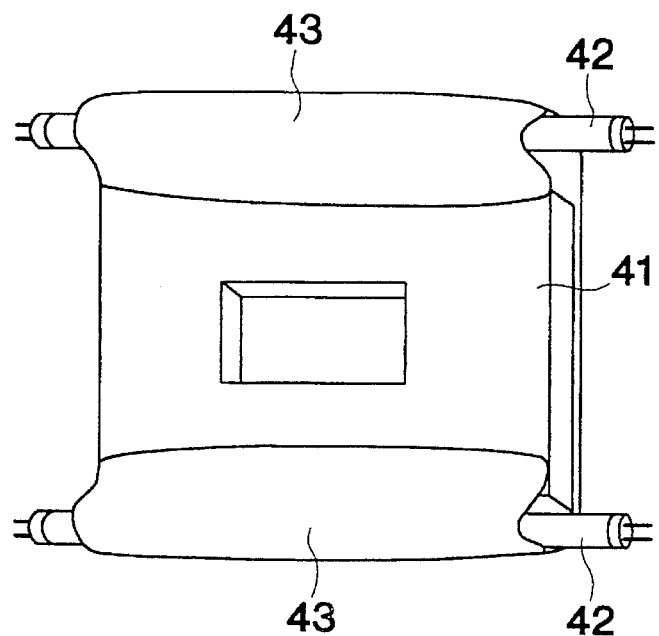
FIG. 7 is a construction view of a back light having a central hole made therein according to the present invention.

The image display unit, according to the present invention, is mounted in a spectacle-like casing 31 which itself is mounted on the observer 37. Each of the left and right spectacle portions of the casing 31 contains the back light 32 for the central visual field, the liquid-crystal display 38, the back light 34 for the peripheral visual field, the slide 38 and the magnifying lens 36 arranged one over the other in said order from the outside. As was explicitly shown in FIG. 4 the back lights 34 for the peripheral visual field and the slides 38 each have one central hole corresponding in size to an effective display area of the liquid-crystal display 33. The back light 34 having a central hole for the peripheral visual field can be manufactured by two methods: the first method is to use a back light provided with two fluorescent lamps 42 arranged one at each of its upper and lower edges and covered respectively with a reflecting sheet 43 as shown in FIG. 7 and a center hole made in a light guide plate 41 of the back light; and the second method is to use an electroluminescent light with a central hole made therein. Both the above-mentioned methods can be provided with a back light being thin enough to be placed on the same plane substantially with the center display 33 and the peripheral slide 38.

Figure 8:
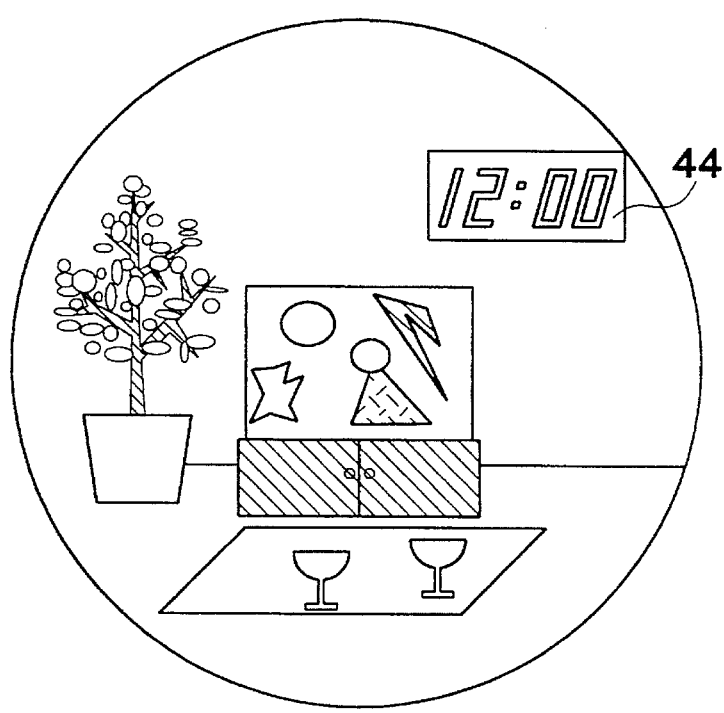
FIG. 8 is another example of a field of vision of an observer when he looks at an image produced by an envi

Accordingly, the observer can see a central image of the liquid-crystal display and peripheral image of the slide as if they were at substantially the same distance. This makes the observer feel as if he was seeing a movie screen in a movie theater in the case of FIG. 5 and as if he was seeing a display in his living room in the case of FIG. 8. Pictures of these slides may be photographed stereoscopically to obtained a binocular stereoscopic vision. Such photographs are effective to increase the reality of an observer's presence in a theater or a living room. In FIG. 8, numeral 44 designates a digital clock for the liquid-crystal display.

Figure 9:
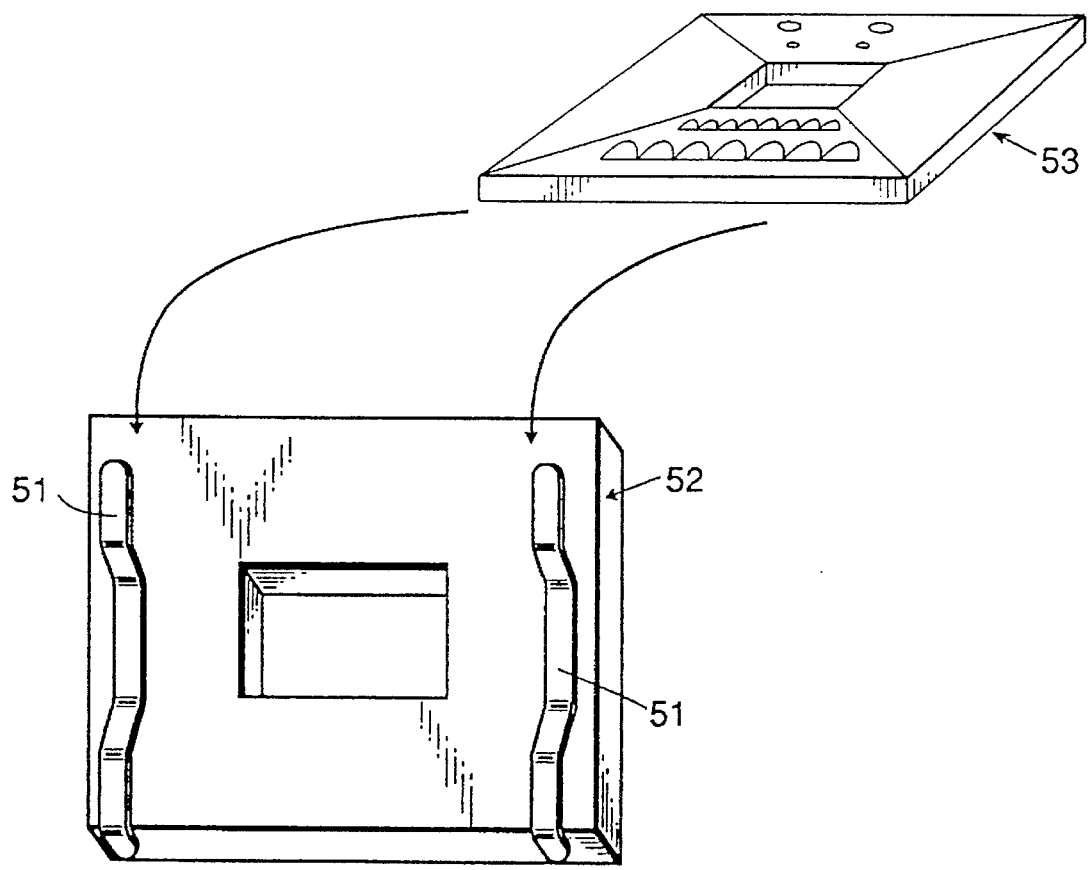
- FIG. 9 is a construction view of a fitting device for removably fixing a slide according to the present invention.

FIG. 9 is a construction view of a fitting for removably fixing a slide which makes it possible to replace the slide with another one. In FIG. 9, numeral 51 designates a fitting for fixing a slide, numeral 52 designates a back light for the peripheral visual field and numeral 53 designates a slide.

By providing the back light 52 with the fittings 51 shown in FIG. 9 it is possible to replace the slide 55 from the top of the head-mounted display shown in FIG. 6. This enables the observer to enjoy the display with his favorite environmental image by selectively mounting the slides. It is also possible to give variety to an environmental image by using a liquid-crystal display in combination with a slide.

For example, in case of the environmental image of the living room shown in FIG. 8, a digital liquid-crystal display is used as the clock 44 to indicate the real time in the living room image. It may be clearly understood that this method is not only applied to the case shown but is also effective for any environmental images, allowing a suitable liquid-crystal display to be put therein.

Figure 10:
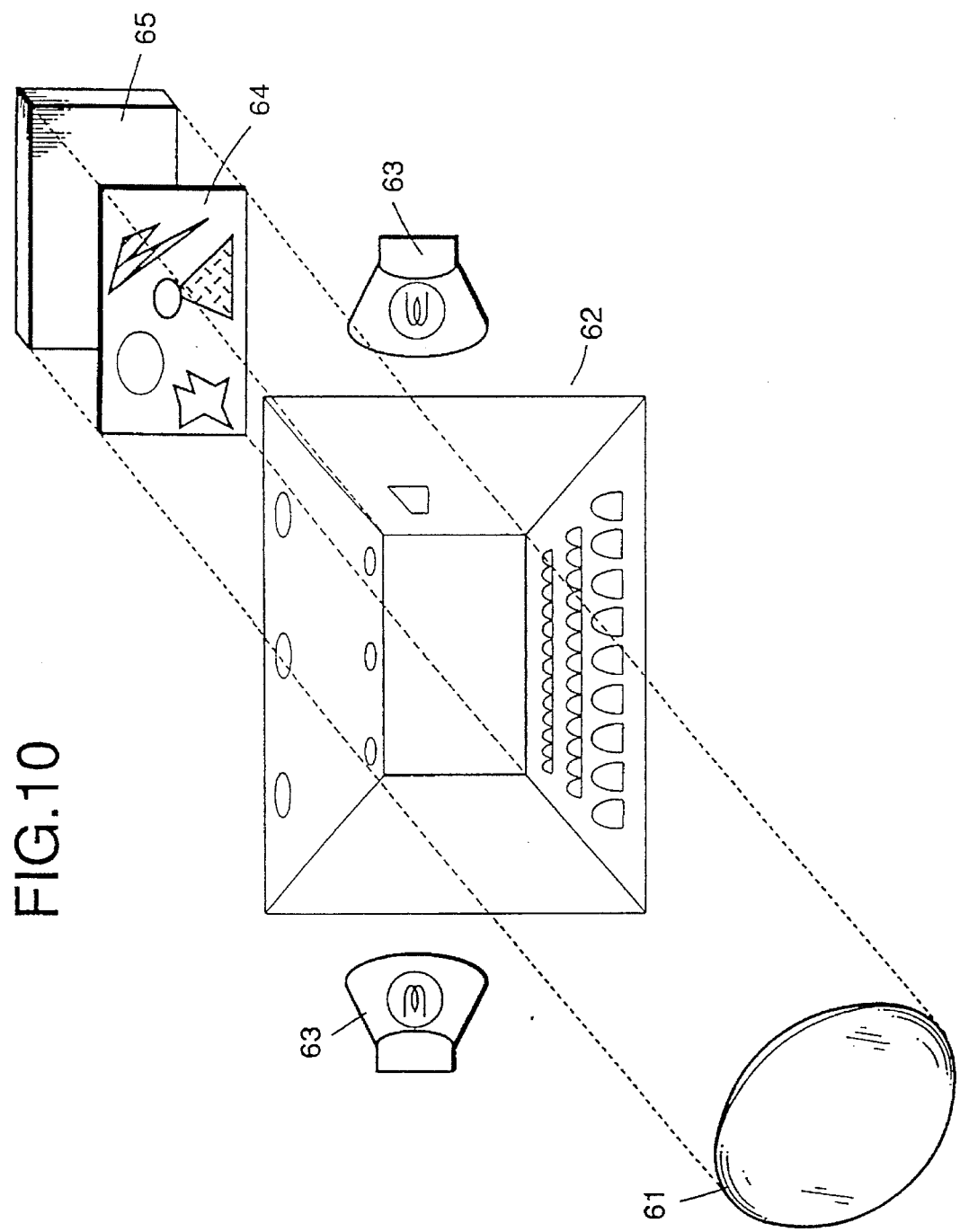
FIG. 10 is a view for explaining an example of an image display unit embodied in the present invention.

Referring to FIG. 10, there is another example shown of an image display unit, according to the present invention. In FIG. 10, 61 is a magnifying lens, 62 is an environmental image display device, 63 is an environmental image lighting device, 64 is a liquid-crystal display, 65 is a back light for central crystal field.

This display device unit has an environmental image display device 62 and an environmental image lighting device 63, as shown in FIG. 10, in place of a conventional diaphragm 11 as shown in FIG. 2. The environmental image display device 62 have one central hole corresponding in size to the effective display area of the liquid-crystal display 64. While in FIG. 10, the back light 65 for the central visual field, the liquid-crystal display 64 and the environmental image display device 62 are shown as separate from each other in the depth direction for the purpose of illustration, they are practically placed one over the other to form one piece. It is also possible to prepare the environmental image display device 62 to replace it with another at the observer's request.

In a thus constructed image display, the observer can see an image as shown in FIG. 5. In FIG. 5, an image of the display 64 is seen in a central frame 26 and a picture image of the environmental display device 62 is seen. The display and the photograph are arranged on the same plane substantially and the observer can see two images enlarged through a magnifying lens 61 as if the images were at the same distance from him. Accordingly, the observer may observe the whole image as if he saw the central display image for example as in a movie theater.

The thus obtained image display offers the following advantages: First, a difference in luminosity between the central portion image and the peripheral portion image (in comparison with the black periphery of the conventional displays) is considerably reduced so as not to make one's eyes tired. Second, a clue for the observer in order to judge the size of the central display is given by the peripheral visual field. For example, in the case of FIG. 5, seats and boundary lines between the floor, the wall and the ceiling can serve as clues which are referred to as <a pitch of texture density> or <a known object's size> in psychology. Consequently, the observer may perceive the center display corresponding in size to the screen of a movie theater, feeling the increased power of the image displayed thereon. Third, the observer may enjoy the ambiance produced by the environmental image and further with any favorite environmental image by selectively replacing the photograph that produces the environmental image.

Figure 11:
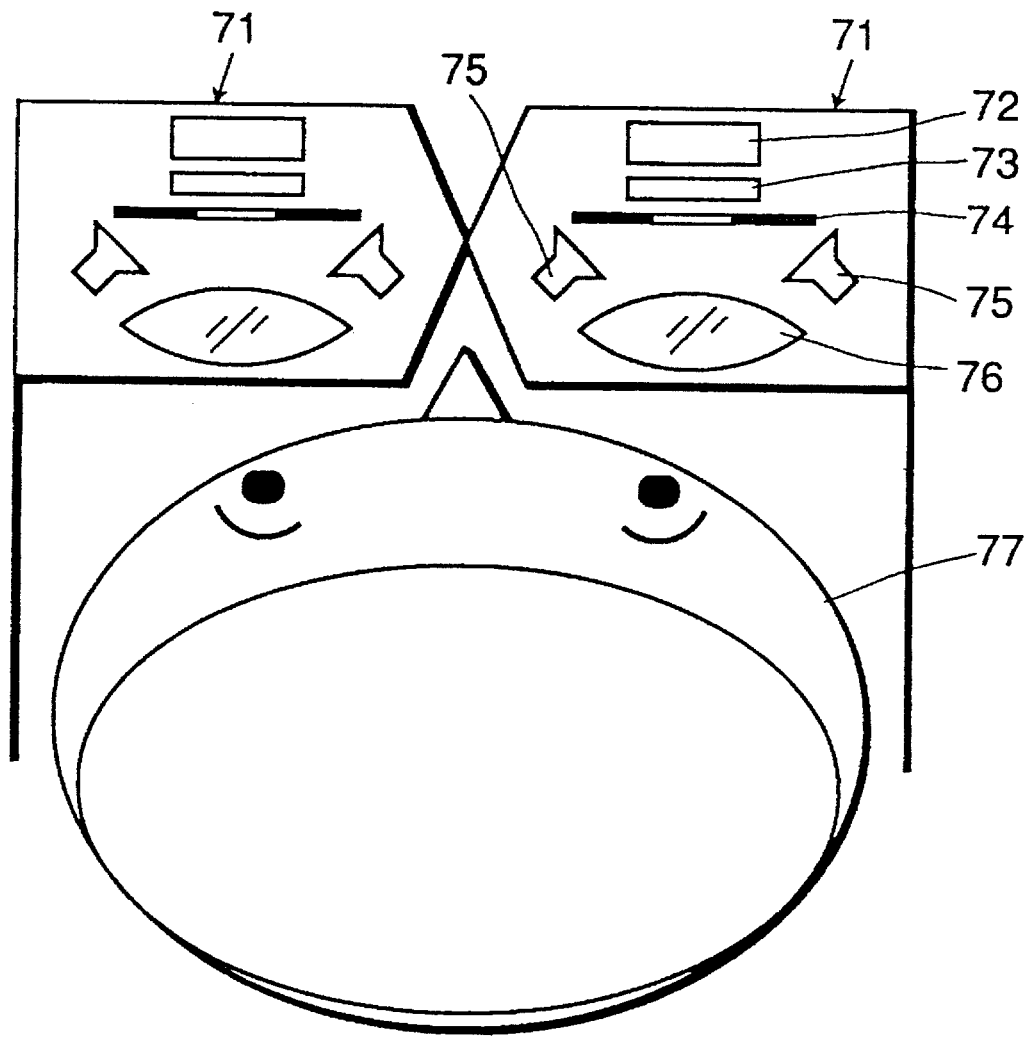
FIG. 11 is a view for explaining an example of a head mounted display with an environmental image display device according to the present invention.

Referring to FIG. 11, there is shown an example of an image display unit according to the present invention, which is applied to a head-mounted display for use in the field of applications of virtual reality. In FIG. 11, 71 is a spectacle-like casing, 72 is a back light for the central visual field, 73 is a liquid-crystal display, 74 is an environmental picture photograph, 75 is a lamp for an environmental image, 76 is a magnifying lens and 77 is an observer.

All components are mounted in a spectacle-like casing 71 which is mounted on the head of the observer 77. Each of the left and right spectacle-like portions of the casing 71 contains the back light 72 for the central visual field, the liquid-crystal display 73, the environmental image photograph 74, the lamp 75 for an environmental image and the magnifying lens 76 which are arranged in order from the outside thereof. The environmental image photograph 74 has a central hole corresponding in size to the effective area of the liquid-crystal display ? S as shown in FIG. 10. In any virtual reality device, it is necessary that an image produced by the display not exist on the display screen but represent a virtual space spreading outwards.

Figure 12:
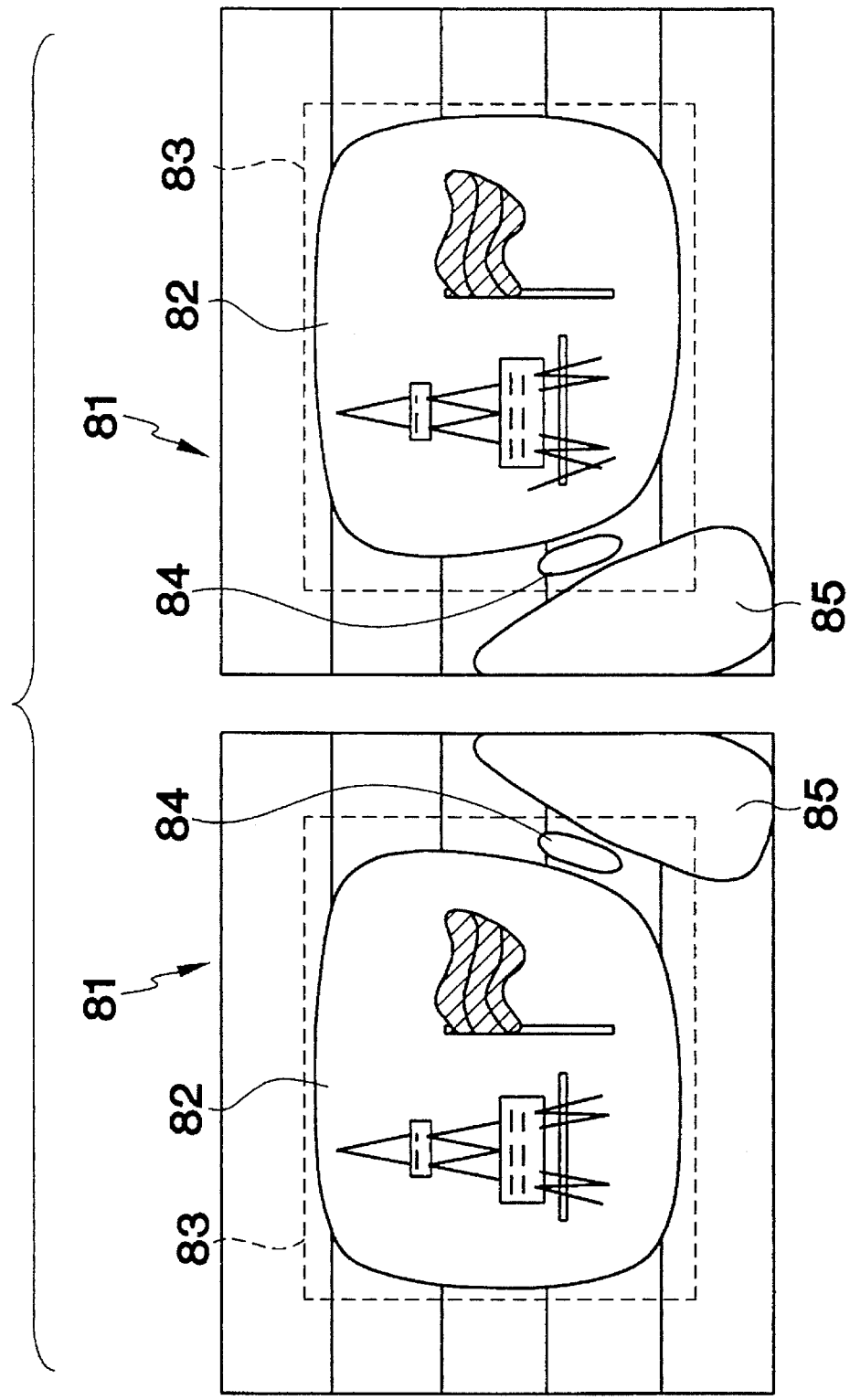
FIG. 12 is a view showing an example of an environmental image usable in a head-mounted display.
Figure 13:
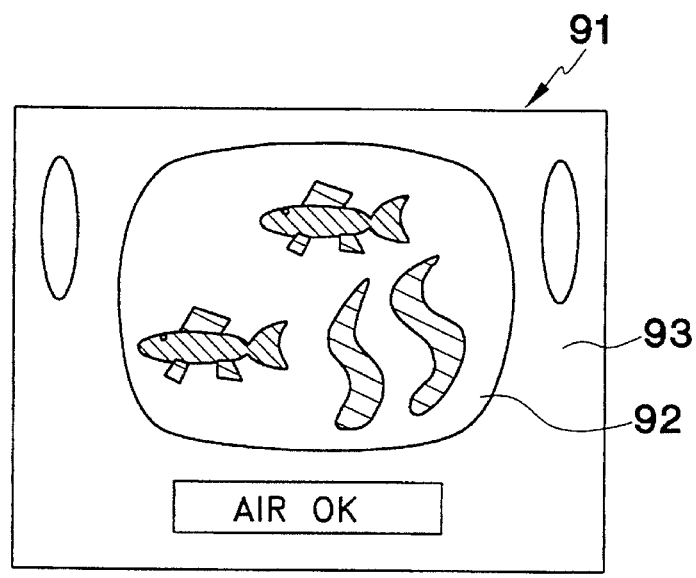
FIG. 13 is a view showing an example of an environmental image usable in a head-mounted display.

To realize the above-mentioned purposes, the embodiment uses a photograph 81 indicating frames 82 of spectacles and a part of one's nose 85 as shown in FIG. 12, there are still shown liquid-crystal displays 83 and nose pads 84 in an environmental image. The observer may look at virtual space through thus constructed spectacles, feeling an increased presence For virtual reality, besides the use of the above-mentioned environmental image of spectacles, it is also possible to internally provide a diving helmet 91 with an environmental image of a space world or an underwater world, e.g., as shown in FIG. 13 where numerals 92 and 93 designate a frame of the environmental image photograph and a liquid-crystal display respectively.

Figure 14:
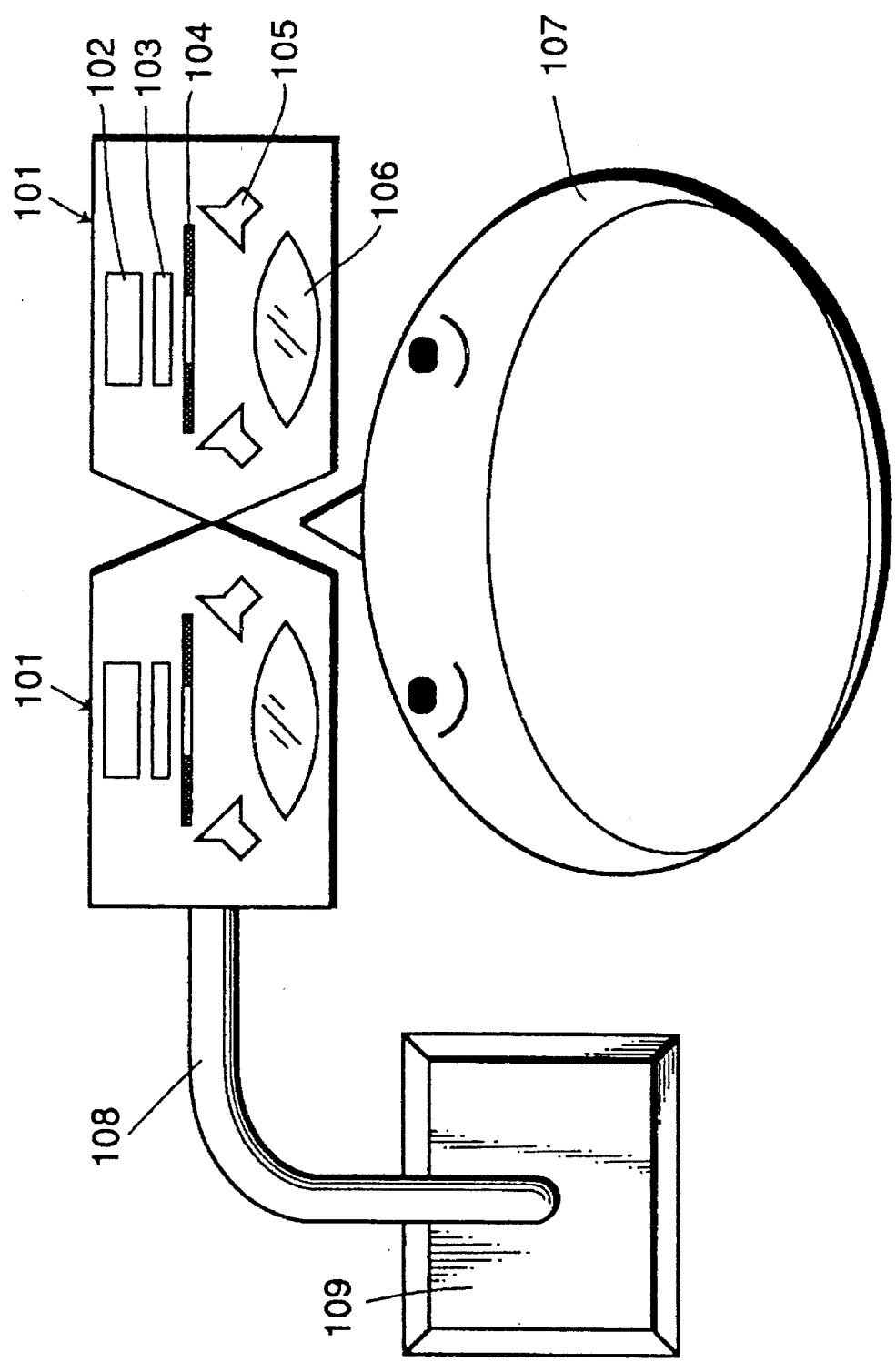
FIG. 14 is a view for explaining an example of a binocular type display with an environmental image display device according to the present invention.

FIG. 14 shows an image display unit according to the present invention, which is applied to a binocular type display for use in a stereoscopic game machine. In FIG. 14, 101 is a binocular type casing, 102 is a back light for the central visual field, 103 is a liquid-crystal display, 104 is a photograph of an environmental image, 105 is a lamp for an environmental image, 106 is a magnifying lens, 107 is an observer, 108 is a supporting arm, 109 is a supporting stand.

Figure 15:
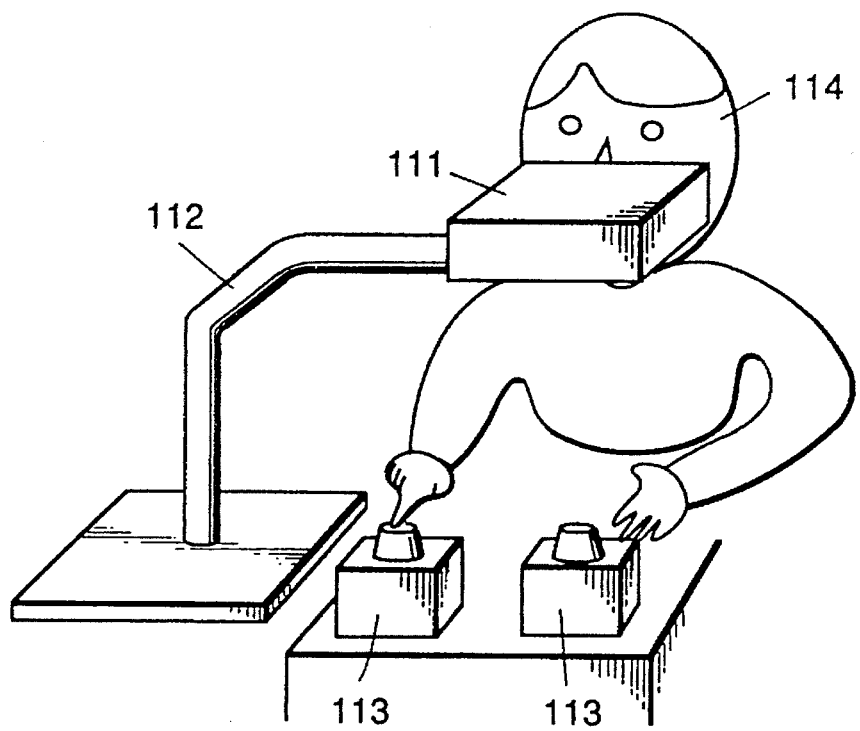
FIG. 15 is a view for explaining how to use a binocular type display with an environmental image display device according to the present invention.
Figure 16:
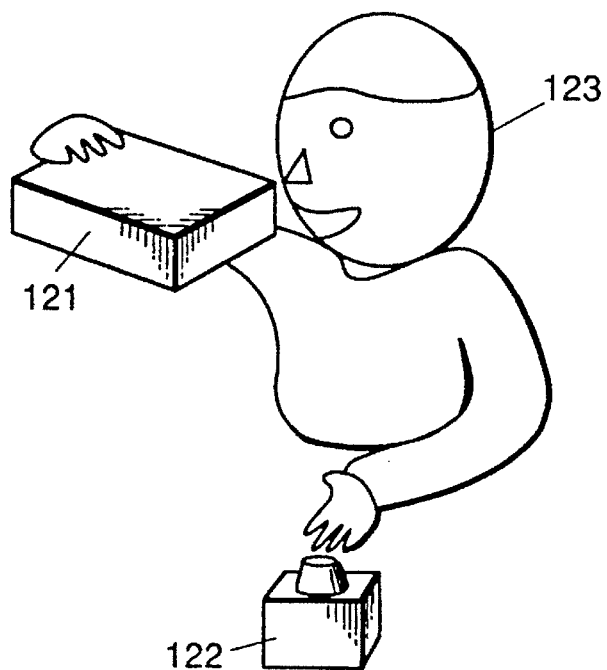
FIG. 16 is a view for explaining how to use a binocular type display with an environmental image display device according to the present invention.

All components are mounted in the binocular type casing 101 which is used by holding with one's hands or by fixing to a supporting pole 108. Each of the left and right viewing portions of the casing contains the back light 102 for the central visual field, the liquid-crystal display 103, the environmental image photograph 104, the lamp 105 for an environmental image and the magnifying lens 106, which are arranged in said order from the outside thereof. The environmental image photograph 104 has a central hole corresponding in size to the effective area of the liquid-crystal display 103 as shown in FIG. 10. Two displays provided one in each of the left and right portions can display an image for binocular stereoscopic vision. The observer may enjoy a stereoscopic game-image in the display. FIGS. 15 and 16 show how to use the display. In FIGS. 15 and 16, 111 and 121 are a binocular type displays, 112 is a supporting arm, 113 and 122 are switches for games, 114 and 123 are observers.

Figure 17:
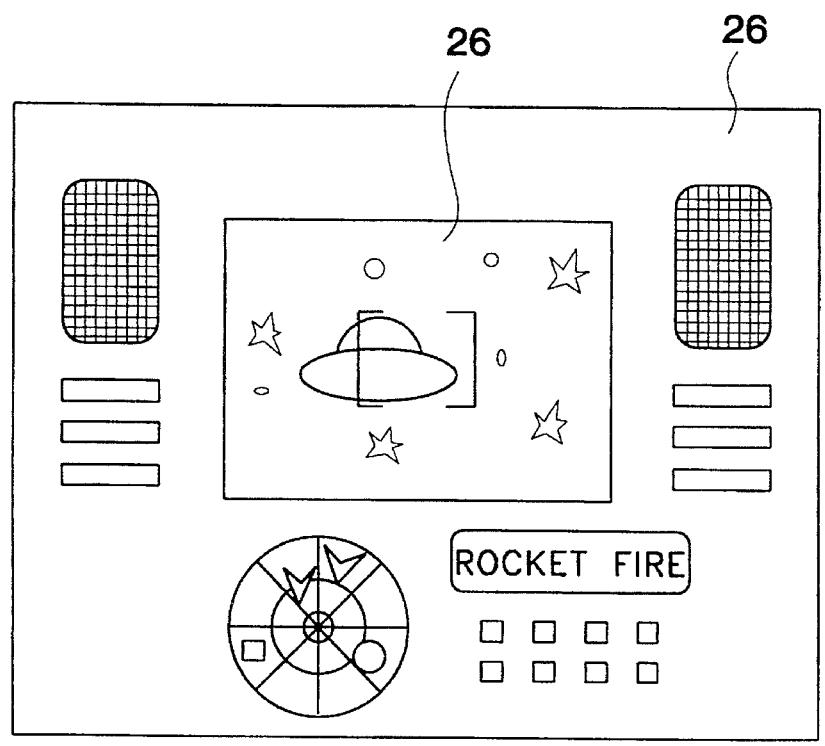
FIG. 17 is a view showing the field of vision of an observer when he sees an image produced by a binocular type display with an environmental image display device according to the present invention.

For example, in the case of playing such a game as one riding on a space craft and fighting with an enemy in space, it is possible to increase the presence of the space image as shown in FIG. 17 by using a photograph 131 of a space craft cockpit as an environmental image. The use of a stereoscopic photograph of an environmental image makes both the environmental image and the main display 132 image to be stereoscopically seen with an increased space ambiance and an increased impression of power.

In the case where a character runs around in a world of the game, it is effective to increase the ambiance of the world by using, as an environmental image display device, reflecting plates which can reflect a part of the light or all of the light.

Figure 18:
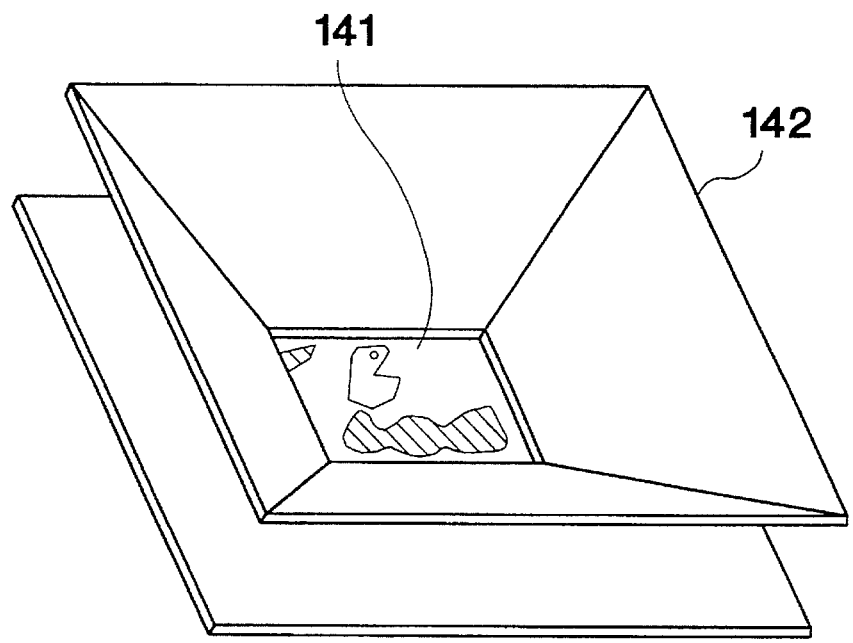
FIG. 18 is a view showing an embodiment of the present invention, wherein a reflecting plate is used as an environmental image display device.

FIG. 18 is the construction view of an image display unit wherein reflecting plates are applied as an environmental image display device. A central display 141 is provided at the periphery thereof with a partially reflecting plate 142 with a funnel shape which can be made of aluminum foil.

Figure 19:
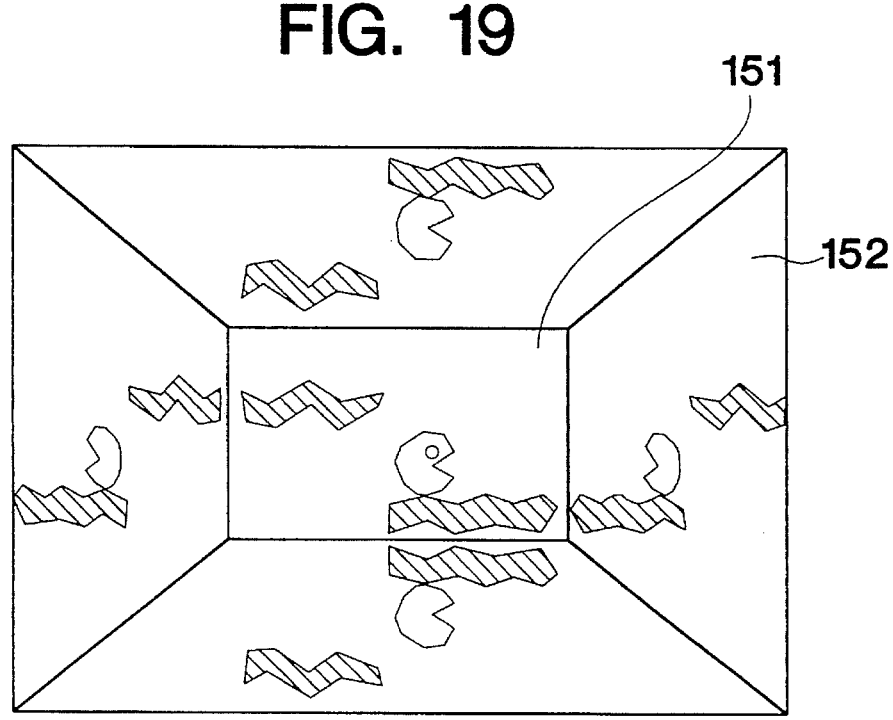
FIG. 19 is a view showing the field of vision of an observer when he sees an image produced by means of a reflecting plate according to the present invention.

FIG. 19 shows the visual field of an image display of FIG. 18 when an observer views an image in it. The image of the display 151 is seen in the central portion of the visual field and a dim reflected image of the central portion's image is seen on a peripheral portion 152 thereof. When playing a game by following a character in the display, one's eyes are directed toward the central portion. Accordingly, a player sees the central portion's image with high eyesight (i.e., visual power) and the peripheral reflected image with low eyesight (i.e.,visual power). This means that the dim image on the reflecting plate does not affect the central image but rather widens the visual field to help the player to be immersed in the game.

Figure 20:
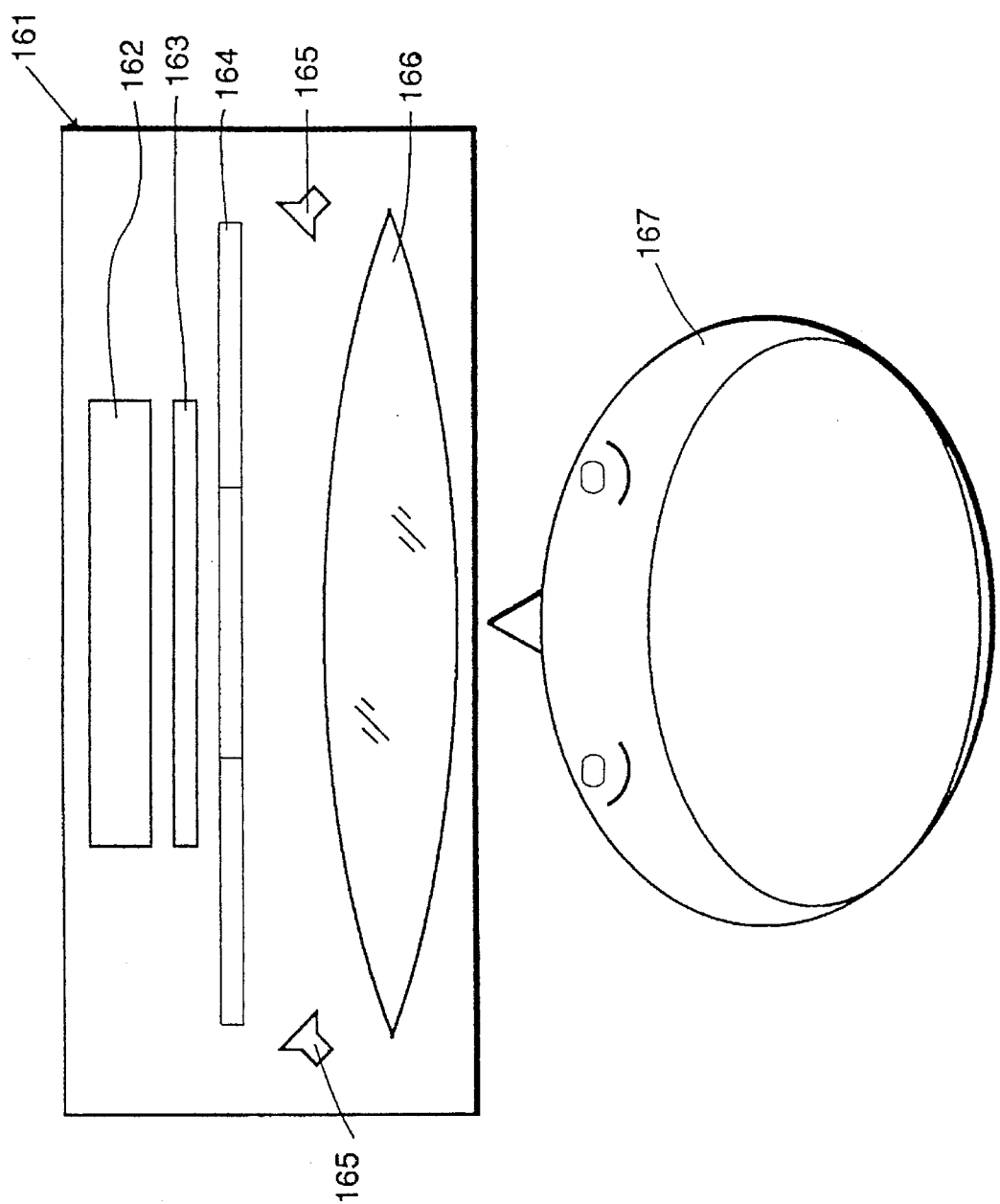
FIG. 20 is a view for explaining a personal monitor provided with an environmental image display device according to the present invention.

Referring to FIG. 20, there is shown an image display unit according to the present invention, which is applied to a personal monitor for enjoying a TV program and a video cassette. In FIG. 20, 161 is a box type casing, 162 is a back light for the central visual field, 163 is a liquid-crystal display, 164 is a photograph of an environmental image, 165 is a lamp for an environmental image, 166 is a magnifying lens and 167 is an observer.

All components are mounted on the box-type casing 161 wherein the back light 162 for the central visual field, the liquid-crystal display 163, the environmental image photograph 164, the lamps 165 for an environmental image and the magnifying lens 166 are arranged each one by one (except the two lamps 165) in said order from the rear outside thereof. This unit is of a single display type which cannot show a stereoscopic image but can be manufactured at correspondingly low cost. In comparison with the above-described display units of the head-mounted type and of the binocular type, wherein two sets of displays are used to be tuned with each other, this type display unit can provide a high quality image with no adjustments.

Figure 21:
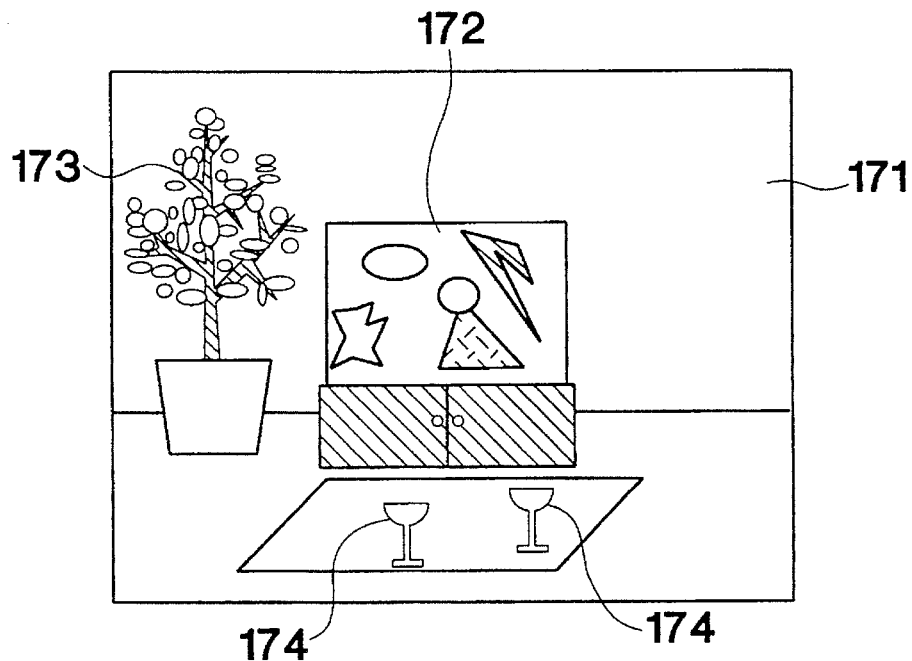
FIG. 21 is a view showing the field of vision of an observer when he sees an image produced by means of a personal monitor provided with an environmental image display device according to the present invention.
Figure 22:
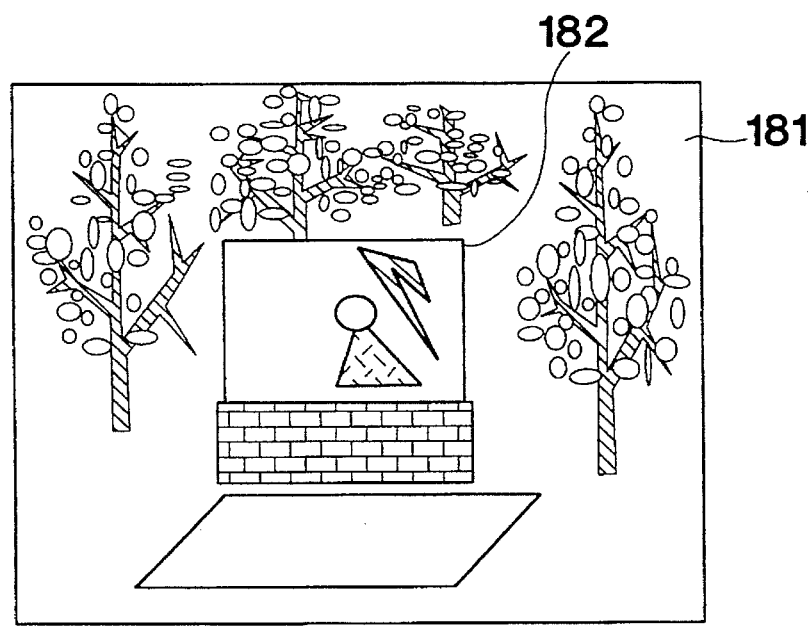
FIG. 22 is a view showing the field of vision of an observer when he sees an image produced by means of a personal monitor provided with an environmental image display device according to the present invention.
Figure 23:
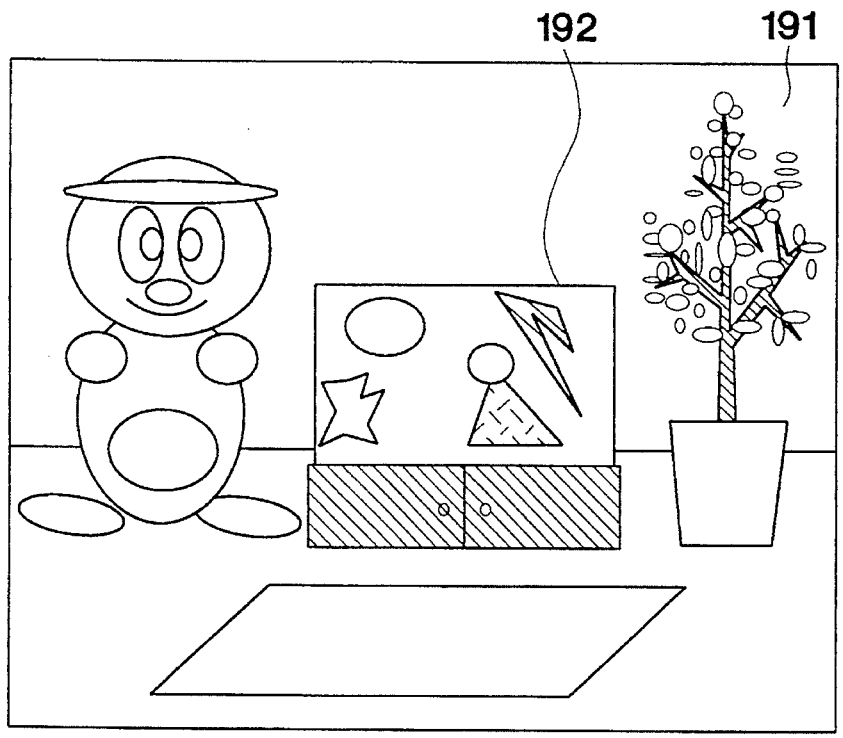
FIG. 23 is a view showing the field of vision of an observer when he sees an image produced by means of a personal monitor provided with an environmental image display device according to the present invention.

FIG. 21 shows a visual field of the personal monitor when an observer views an image on the monitor. An environmental image is of a living room sight 171. Since one unconsciously compares the size of the display 172 with familiar objects such as a potted plant 173 and wineglasses 174 as shown in the environmental image, he may perceive the display image as being larger and enjoy the image with an increased power and with easy feeling about the living image. It is possible to apply any environmental image according to the observer's preference, e.g., the image of a forest 181 of FIG. 22, or a comical character's picture 191 of FIG. 23 in place of the living sight-image. In FIGS. 22 and 23, numerals 182 and 192 indicate a boundary between an environmental image photograph and a center display-image.

How to realize an environmental image display device is described as follows:

As described herein, the environmental image display device can be realized by using a photograph, a printed picture image, a pseudo-stereoscopic model with irregular surfaces, a stereoscopic model, a liquid-crystal display or cathode-ray tube display with a half-mirror, and a projector with a half-mirror. The photographic means are easy to manufacture and are suitable for experimental use. The printed picture means are suited for mass production. The pseudo-stereoscopic relief model or the stereoscopic model is effective to produce stereoscopic vision even in the case of using a single environmental image display device.

Figure 24:
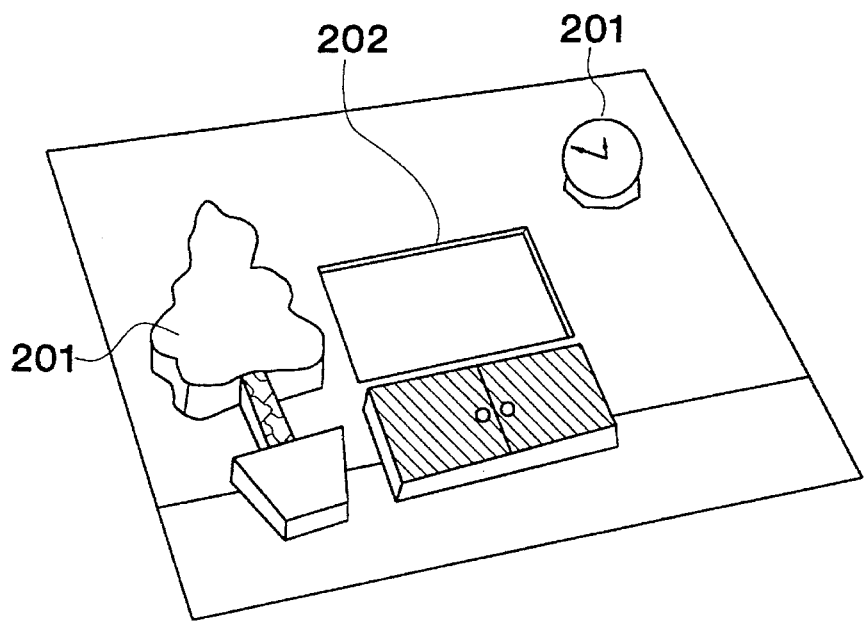
FIG. 24 is a view for explaining an environmental image display device which is a pseudo-stereoscopic model according to the present invention.

The pseudo-stereoscopic relief model can be manufactured by any of two of the following methods:

The first method is such that cardboard sheets are adhered to each other, one upon the other to form a high relief 201 on a surface of the model as shown in FIG. 24. The second method is to form a relief on a surface of plastic plates by using a press. The boundary of a central display area is surrounded by an environmental image display device shown by numeral 202.

Figure 25:
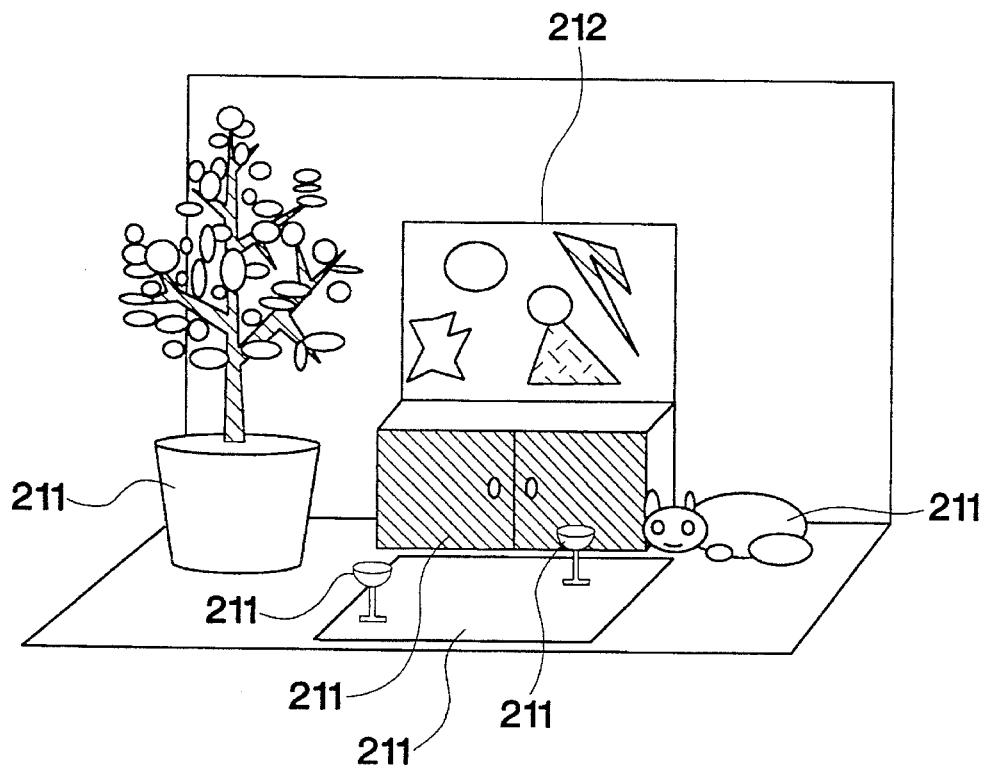
FIG. 25 is a view for explaining an environmental image display device which is a pseudo-stereoscopic model according to the present invention.

As shown in FIG. 25, the stereoscopic model stereo-miniature elements 211 which are practically placed near a central image display 212. Numeral 212 also indicates the boundary between the central image display and the environmental image display device. In the case of the display unit with a magnifying lens, the central image display and the environmental image display device is normally placed near the focal point of the magnifying lens. In this case, even a small relief may cause a considerable change in the virtual image's position. Consequently, all the above-mentioned pseudo-stereoscopic and stereoscopic methods can produce an adequate, perspective, stereoscopic, environmental image.

Figure 26:
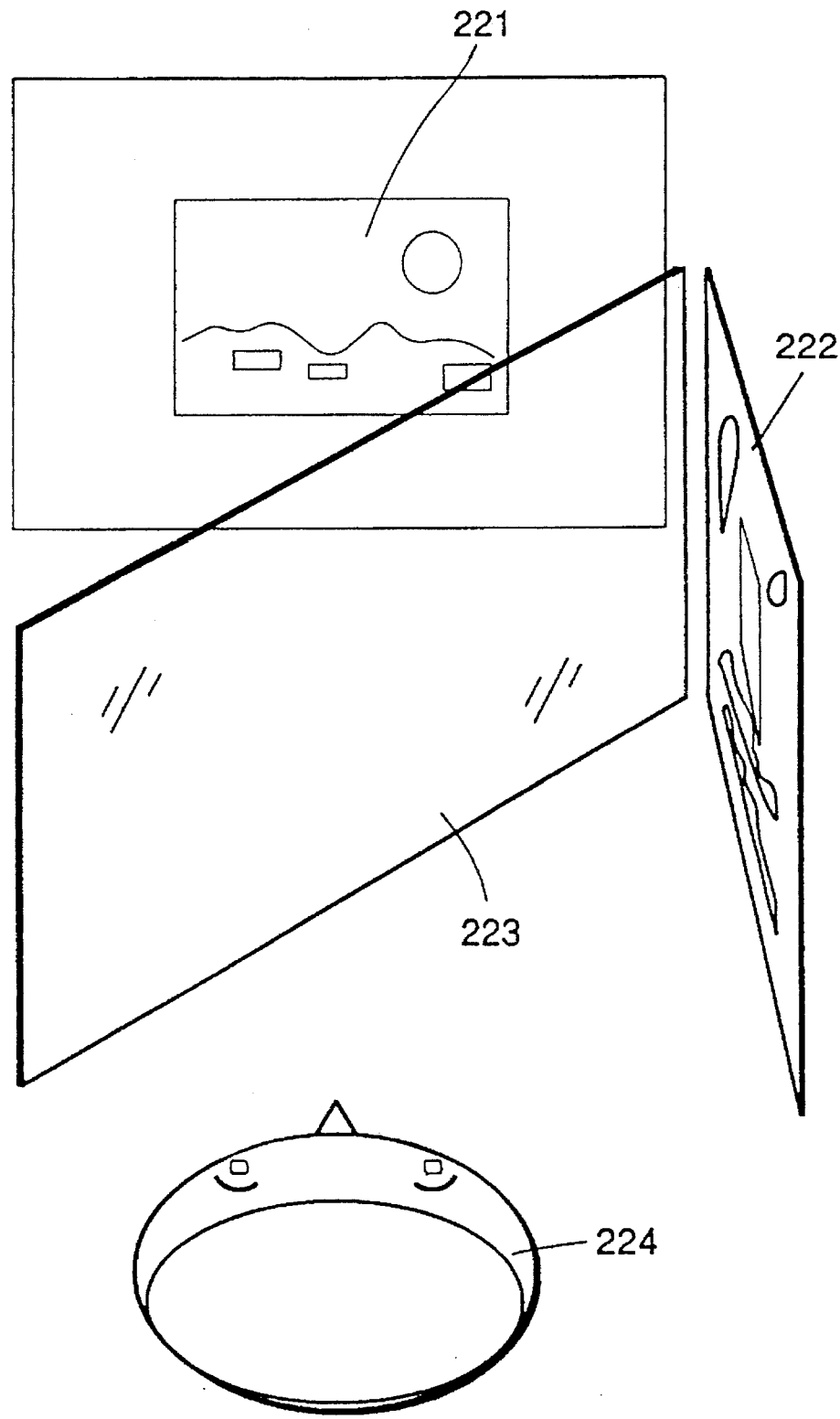
FIG. 26 is a view for explaining an environmental image display device which is composed of a liquid-crystal display or a CRT and a half-mirror according to the present invention.
Figure 27:
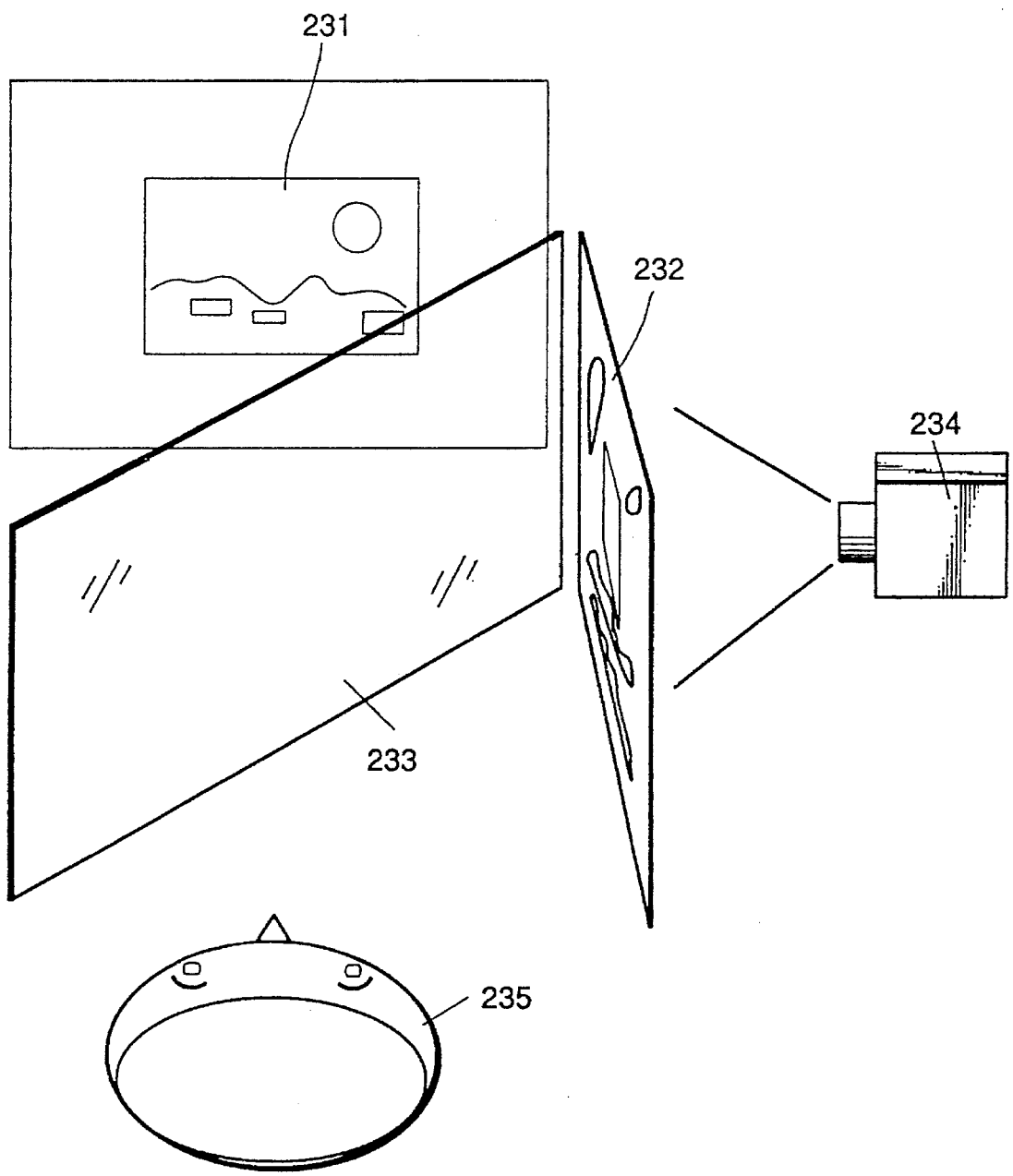
FIG. 27 is a view for explaining an environmental image display device which is composed of a projection type display and a half-mirror according to the present invention.

In the case of using animation or frequently changing the environmental image, it is recommended to adopt such an environmental image display device as a liquid-crystal display and a half-mirror, a CRT display and a half-mirror, or a projection display and a half-mirror. As shown in FIGS. 26 and 27, these three methods are intended to superimpose an image of a central display 221, 231 onto a peripheral environmental image 222, 232 by using a half-mirror 223, 233. In the case of using a projection type display 234, an environmental image is projected onto a screen 232 and the superimposed image is viewed from the rear. Numerals 224 and 235 designate observers.

The following description refers to how to change an environmental image to another without using a half mirror.

Figure 28:
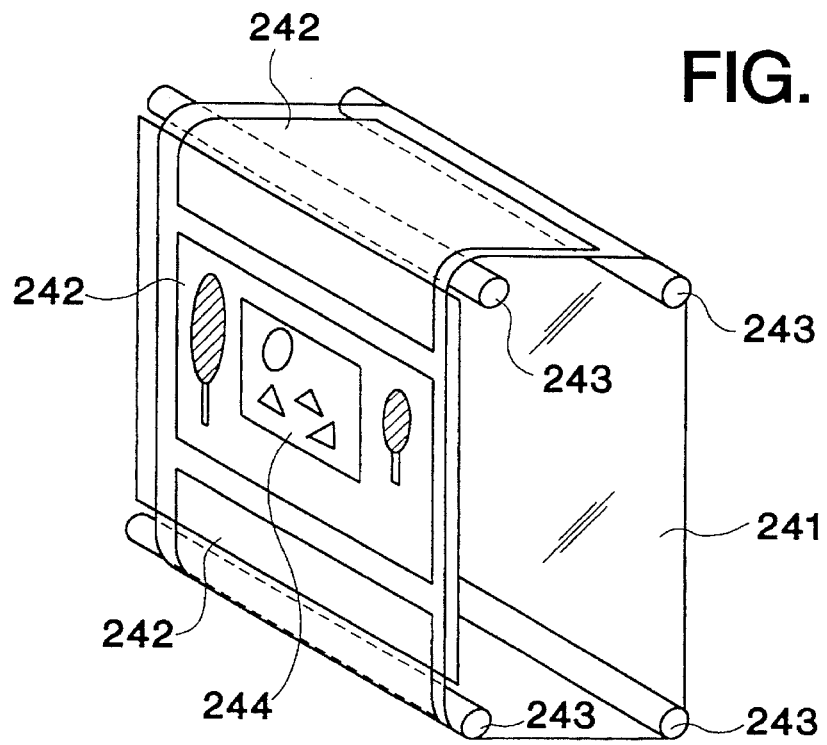
FIG. 28 is a view showing an example of a replacer for an environmental image display device, according to the present invention.

Referring to FIG. 28, a first method is such that a film 241 whereon a plurality of environmental images 242 are printed is fed forward by rotating a film-feeding mechanism 243 until the next or desired environmental image reaches the given position relative to the central display 244.

Figure 29:
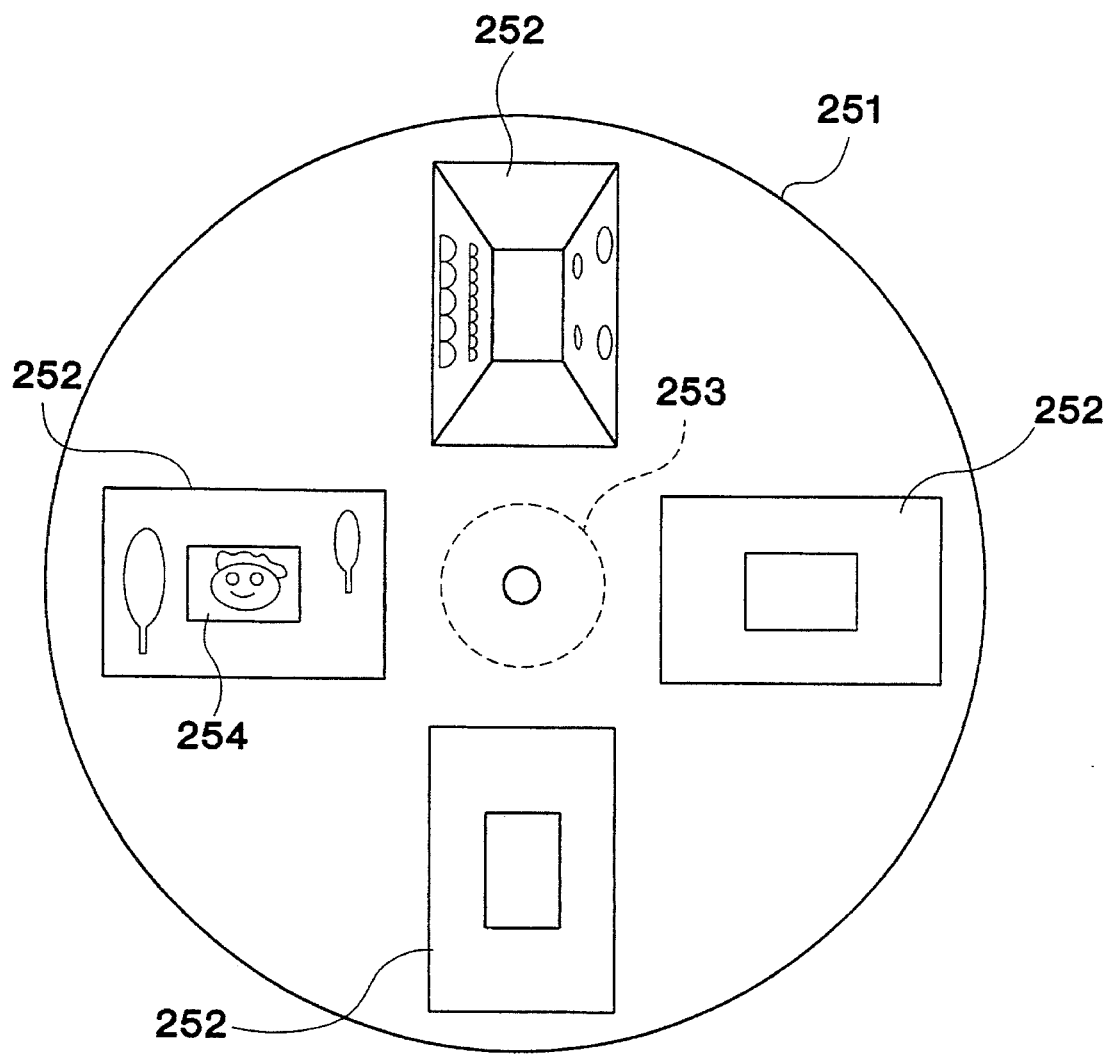
FIG. 29 is a view showing an example of a replacer for an environmental image display device, according to the present invention.

Referring to FIG. 29, a second method is such that a disk 251 whereon a plurality of environmental images 252 are printed is turned by rotating a film-feeding mechanism 253 until the next or desired environmental image attains the given position relative to the central display 254.

By using any one of the above-mentioned methods, which can easily replace the environmental image with the desired one, it is possible to freely select an environmental image of the observer's preference or to enjoy the main display with an optimal, environmental image.

Figure 30:
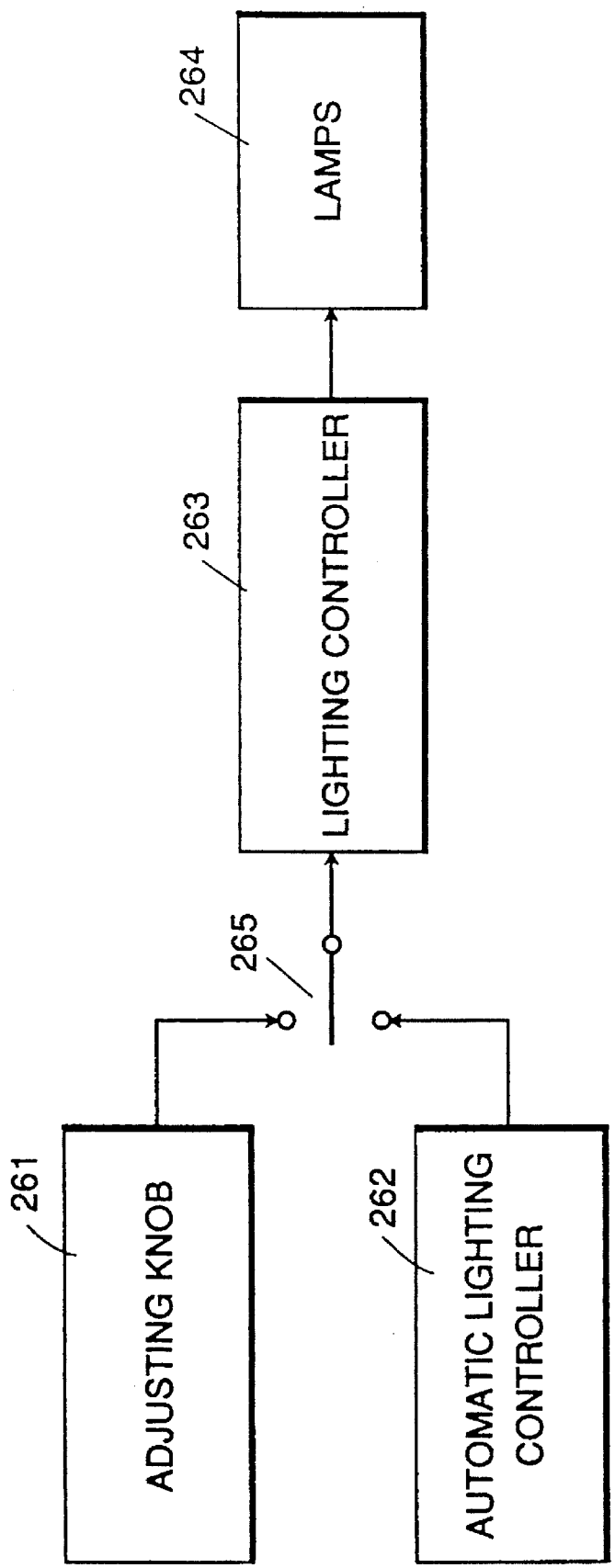
FIG. 30 is a construction view of a lighting device usable for an image display unit according to the present invention.

Lighting the environmental image is explained as follows:

Lighting the environmental image can be realized with an incandescent lamp and a fluorescent lamp. As shown in FIG. 30, these lamps 264 are controlled by a lighting controller 263 according to the kinds of displays to be seen, for example, in such a way that the luminosity of the environmental image may be adjusted to <high> in case of enjoying a TV program or to <low> in the case of viewing a movie by means of an adjusting knob 261 of the controller 263. An automatic lighting controller 262 can gradually darken the illumination of the environmental image to begin a movie as if it was effected in a movie theater. Numeral 265 designates a change-over switch for switching over the control mode from the manual adjusting knob 261 to the automatic lighting controller 262 and vice versa.

Figure 31:
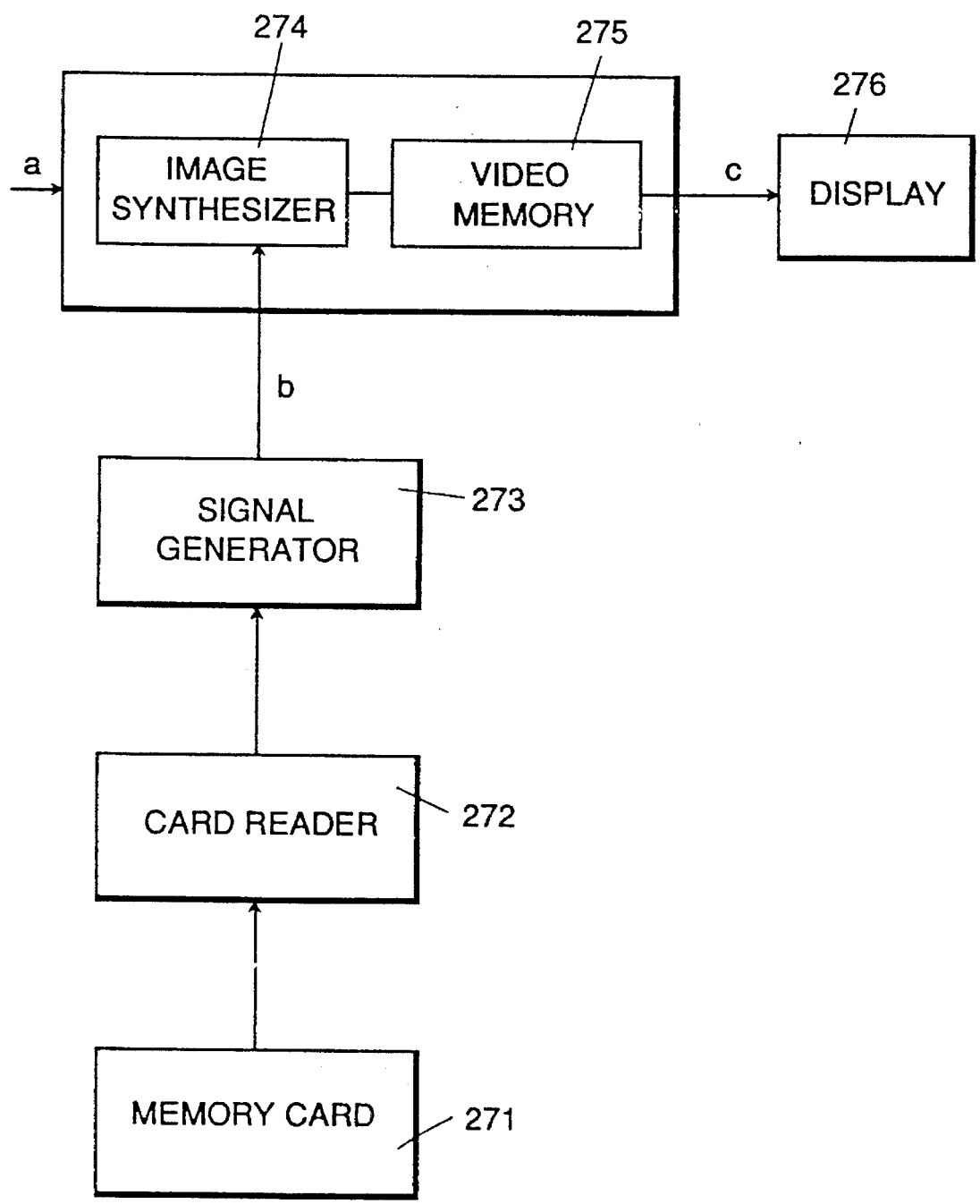
FIG. 31 is a construction view of another example of an image display unit, according to the present invention.

FIG. 31 shows another example of an image display unit according to the present invention, which includes a memory card 271, a card reader 272, a signal generator 273, an image synthesizer 274, a video memory 275 and a display 276.

Environmental image data from the memory card 271 are read out by the card reader 272 and sent to the signal generator 273 which in turn generates a corresponding environmental image. The image synthesizer 274 writes an input image (a) and an environmental image (b) onto the video memory 255 to produce a synthesized image (c) which is then displayed on the display 276. In a head-mounted display, the image displayed on the display 276 is further enlarged through a magnifying lens system.

Figure 32:
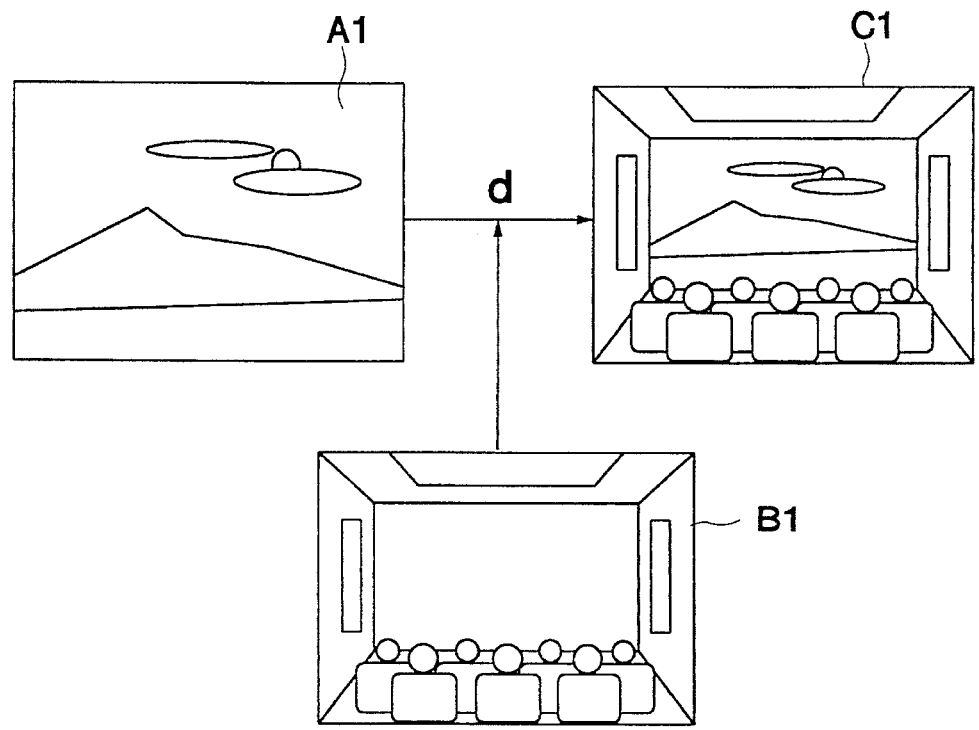
FIG. 32 is an explanatory view (1) of a practical example of a synthesized environmental image according to the present invention.

Referring to FIG. 32, there is shown an example of obtaining an output image $C_1$ by synthesizing (d) an environmental image $B_1$ of <movie theater> onto an input image $A_1$. While the output image $A_1$ includes the input image $C_1$ reduced in size as the result of synthesizing thereto the environmental image $B_1$, one can visually perceive the input image, by the effect of the perspective environmental image at the periphery thereof, as if he saw a large movie screen of a movie theater. He may feel the increased ambiance of the movie theater.

The input image $A_1$ is synthesized with a peripheral environmental image $B_1$ to generate the output image $C_1$ in which it is displayed at the center portion thereof with a reduced size. However, the environmental image $B_1$ provides a clue to estimate the size of the central display image $C_1$ and makes the observer perceive the central display image $A_1$ as if it was seen on a movie screen in a movie theater with a raised ambiance. It is also possible to freely adjust the ambiance of the output image $C_1$ by changing the size patio of the input image $A_1$ and the environmental image $B_1$. Accordingly, this method enables an observer to set the ambiance of the output image at any desired degree or to increase the ambiance by increasing the environmental image at the beginning of seeing the display and then to gradually reduce the size ratio of the environmental image for increasing the impressive power of the main image to make the observer be attracted therein. It is further possible for the observer to selectively change an environmental image $B_1$ with another accordingly to his preference.

The application of the present invention to a head-mounted display, for use in virtual reality, is effective for attaining a higher form of virtual reality.

Figure 33:
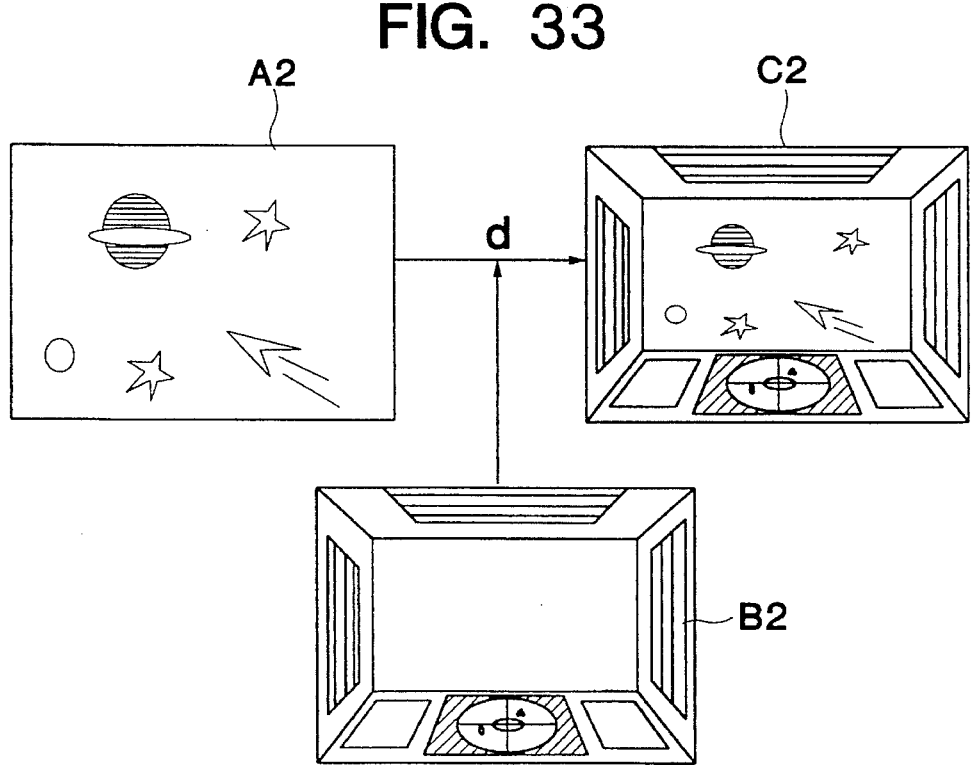
FIG. 33 is an explanatory view (2) of a practical example of a synthesized environmental image according to the present invention.

Referring to FIG. 33, there is shown an example of obtaining an output image $C_2$ by synthesizing (d) an environmental image $B_2$ of <the inside of a space craft> onto an input image $A_2$. In this instance, the environmental image $B_2$ of <a cockpit of a space craft> synthesized onto the input image makes an observer feel as if he was seeing space from the cockpit of a space craft. If the input image of a shooting game is applied, the observer can enjoy the game with increased ambiance.

Figure 34:
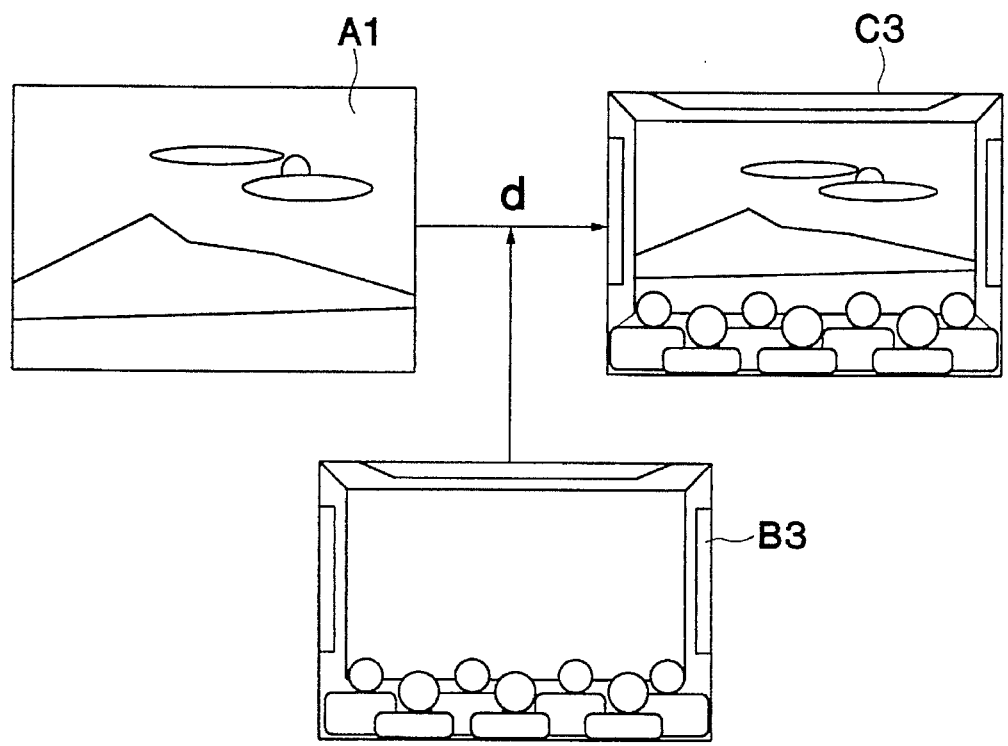
FIG. 34 is an explanatory view (3) of a practical example of a synthesized environmental image according to the present invention.

Referring to FIG. 34, there is shown an example of obtaining an output image $C_3$, which differs from the output image $C_1$, by synthesizing (d) an environmental image $B_3$ onto an input image $A_1$ at an optionally set ratio. Since the image synthesizing ratio can be freely adjusted, it is possible to produce an increased ambiance of the environmental image by increasing the size of said image or an increased ambiance of the input image by increasing the size of said image to make the observer be attracted thereby.

Figure 35:
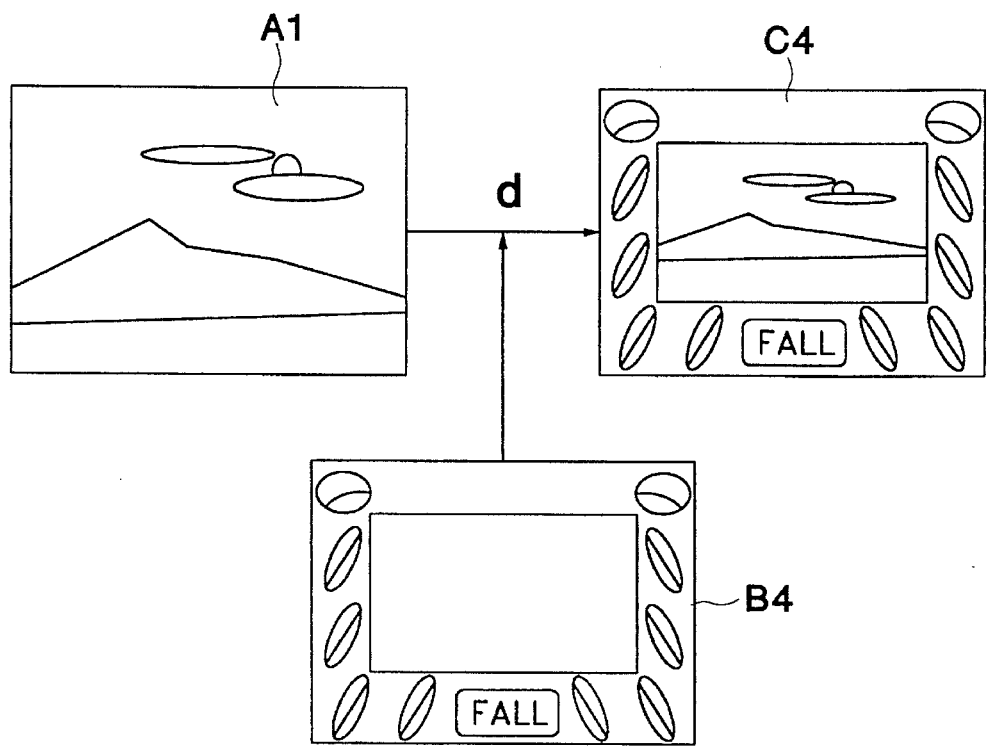
FIG. 35 is an explanatory view (4) of a practical example of a synthesized environmental image according to the present invention.

Referring to FIG. 35, there is shown an example of obtaining an output image $C_4$ by synthesizing (d) an environmental image $B_4$ of <title back> onto an input image $A_1$. In this instance, the environmental image can be superimposed. This technique is effective to arrange images originally, e.g., by giving an album-like representation thereto.

Figure 36:
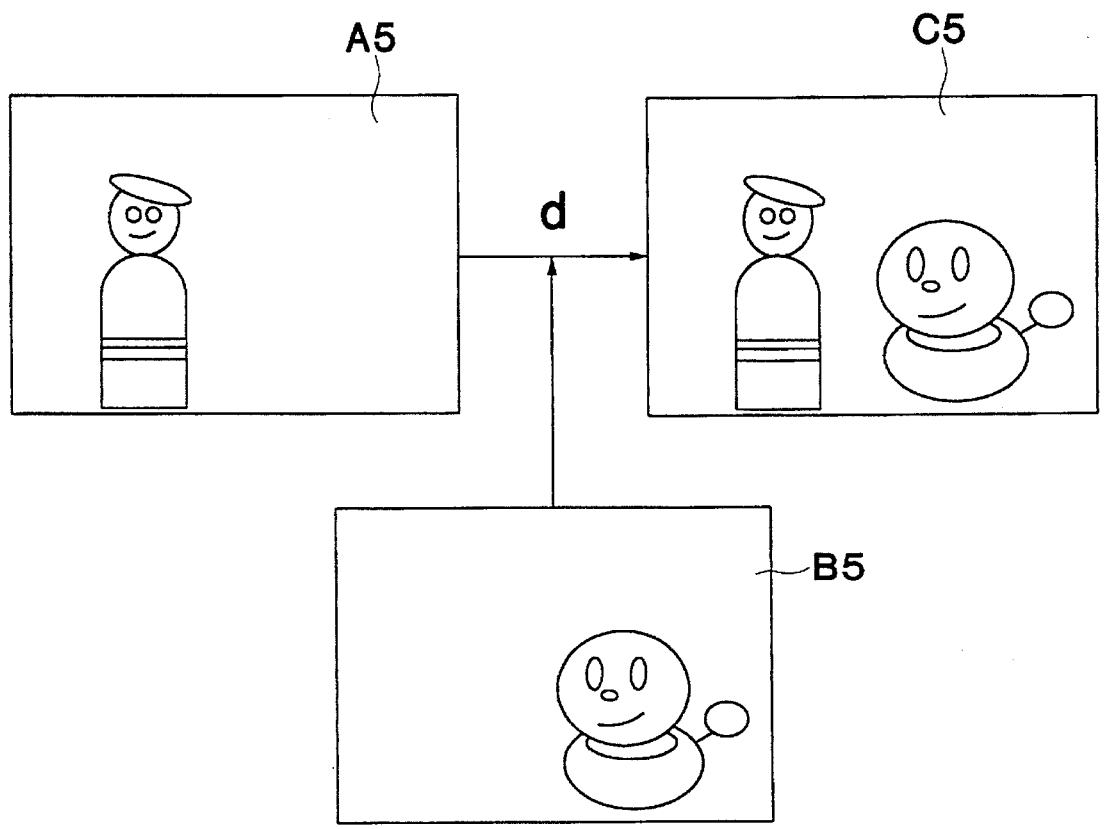
FIG. 36 is an explanatory view (5) of a practical example of a synthesized environmental image according to the present invention.

Referring to FIG. 36, there is shown an example of obtaining an output image $C_5$ by synthesizing (d) an environmental image $B_5$ of <a character> onto an input image $A_5$. In this instance, one can feel as if he saw a child together with a character in an image. By synthesizing an input image of a child with an environmental image of a character from animation it is possible to create an output image of an animation-related or dreamy imaginary world.

Figure 37:
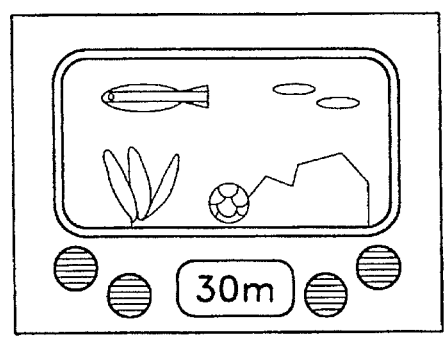
FIG. 37 is an explanatory view of a practical example of synthesizing an environmental image with an image displayed through a head-mounted type display unit according to the present invention.

Referring to FIG. 37, there is shown an example of an image display unit, according to the present invention, which is applied to a head-mounted display for use in virtual reality. In this example, an image of the inside of a diving helmet is used as an environmental image which may cause the observer to feel as if he was wearing a diving suit and submerged in water.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

We claim:

1. An image display unit comprising:

a casing;

an image display within the casing, said image display displaying a center image;

environmental image display means within the casing at the periphery of said image display for displaying an environmental image, the environmental image providing a background context for the center image; and image magnifying means within the casing for magnifying images produced by the image display and by the environmental image display means and for allowing an observer to view the magnified environmental image together with the magnified center image in a visual field through the image magnifying means.

2. An image display unit comprising two image display units defined in claim 1, which are disposed one against each of the right and left eyes of an observer to provide binocular vision.

3. An image display unit as defined in claim 1, wherein the image display comprises a liquid-crystal display and a back light.

4. An image display unit as defined in claim 3, wherein the back light is an electro-luminescent lamp.

5. An image display unit as defined in claim 1, wherein the environmental image display means comprises a slide and a back light.

6. An image display unit as defined in claim 5, wherein the slide is replaceable with another slide.

7. An image display unit as defined in claim 5, wherein the slide is a stereoscopic photograph for providing binocular vision.

8. An image display unit as defined in claim 1, wherein the environmental image display means comprises a slide, a liquid-crystal display and a back light, said liquid-crystal display being capable of varying a part of an environmental image.

9. An image display unit as defined in claim 1, further comprising a lighting means for lighting the environmental image display means.

10. An image display unit as defined in claim 9, wherein at least two image displays, at least two environmental image display means and at least two image magnifying means are used.

11. An image display unit comprising two sets of image display units as defined in claim 9, which are disposed one for each of the left and right eyes of an observer to provide binocular vision.

12. An image display unit as defined in claim 9, wherein the environmental image lighting means comprises a lighting apparatus and a lighting control unit for automatically adjusting the lighting.

13. An image display unit as defined in claim 9, wherein the environmental image display means comprises a photograph.

14. An image display unit as defined in claim 9, wherein the environmental image display means comprises a printed matter.

15. An image display unit as defined in claim 9, wherein the environmental image display means comprises a pseudo-stereoscopic model having irregularities on its surface.

16. An image display unit as defined in claim 9, wherein the environmental image display means comprises a stereoscopic model.

17. An image display unit as defined in claim 9, wherein the environmental image display means comprises a reflecting plate for reflecting at least a part of an image coming from the image display to form an environmental image on the periphery of the center image.

18. An image display unit as defined in claim 9, wherein the environmental image display means comprises a ribbon-like film including a plurality of environmental images and a film-feeding mechanism for changing one environmental image to another.

19. An image display unit as defined in claim 9, wherein the environmental image display means comprises a disc including a plurality of environmental images and a disc-rotating mechanism for rotating a disc to change over from one environmental image to another.

20. An image display unit as defined in claim 9, wherein the environmental image display means comprises a liquid crystal display containing an environmental image out of a direct line of sight from an observer to the image display and a half-mirror which superimposes said environmental image onto the periphery of said image display.

21. An image display unit as defined in claim 9, wherein the environmental image display means comprises a screen positioned out of a direct line of sight from an observer to the image display, a projection display which projects an environmental image onto said screen, and a half-mirror which superimposes the environmental image onto the periphery of the image display.

22. An image display unit as defined in claim 9, wherein the environmental image display means comprises a cathode-ray tube which displays an environmental image out of a line of sight from an observer to the image display and a half-mirror which superimposes the environmental image onto the periphery of the image display.

23. An image display unit as defined in claim 9, wherein said lighting means includes a lighting apparatus and a lighting control unit which automatically adjusts the lighting to further simulate an environment displayed by the environmental image display means.

24. An image display unit as defined in claim 1, wherein the environmental image display means includes a display containing the environmental image out of a direct line of sight from an observer to the image display and means for superimposing the environmental image and an image produced by the image display.

25. An image display unit as defined in claim 1, wherein the environmental display means includes a reflecting plate for reflecting at least part of an image coming from the image display to form an environmental image in the periphery of the image display.

26. An image display unit comprising:

image synthesizing means for synthesizing an environmental image in a periphery of an input image;

environmental image generating means for generating an environmental image which is synthesizable in the periphery of the input image, the environmental image providing a background context for the input image; and a display for displaying the input image together with the environmental image synthesized thereto in a visual field of an observer.

27. An image display unit as defined in claim 26, further comprising an image synthesizing control unit for varying a ratio of the input image and the environmental image in the frame of a display unit.

28. An image display unit as defined in claim 27, further comprising an environmental image replacing means for changing over an environmental image that is synthesizable around the input image to another environmental image according to external information.

29. An image display unit as defined in claim 26, wherein said environmental image generating is in accordance with one of a user selection and the input image, and the environmental image generated is devoid of information in the input image.

* * * * *